US 6,742,896 B2

(12) United States Patent
Quiroz

(10) Patent No.: US 6,742,896 B2
(45) Date of Patent: Jun. 1, 2004

(54) FILM TRAP AND GATE ASSEMBLY FOR A MOTION PICTURE PROJECTOR

(75) Inventor: Donald Quiroz, Oxnard, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/859,152

(22) Filed: May 15, 2001

(65) Prior Publication Data

US 2002/0171808 A1 Nov. 21, 2002

(51) Int. Cl.$^7$ .................................................. G03B 1/48
(52) U.S. Cl. ........................................ 352/221; 352/224
(58) Field of Search ................................. 352/221–231

(56) References Cited

U.S. PATENT DOCUMENTS

| | | | | |
|---|---|---|---|---|
| 1,473,465 A | * | 11/1923 | Clark | 352/224 |
| 1,828,768 A | | 10/1931 | Dina | |
| 1,884,609 A | * | 10/1932 | Dina | 352/224 |
| 1,991,870 A | | 2/1935 | Schulz | |
| 2,211,826 A | * | 8/1940 | Kindelmann et al. | 352/224 |
| 3,610,744 A | * | 10/1971 | Kakiuchi et al. | 352/27 |
| 3,700,318 A | | 10/1972 | Cunningham, Jr. | |
| 3,752,569 A | | 8/1973 | Nelson et al. | |
| 3,776,626 A | | 12/1973 | Lewis | 352/194 |
| 3,954,330 A | * | 5/1976 | Sakaguchi et al. | 352/224 |
| 4,144,991 A | * | 3/1979 | Eddy | 226/195 |
| 4,522,476 A | | 6/1985 | Renold | |
| 4,744,651 A | | 5/1988 | Beauviala | 352/225 |
| 4,778,093 A | * | 10/1988 | Renold | 226/113 |
| 5,258,807 A | | 11/1993 | Reinke | |
| 5,323,193 A | | 6/1994 | Weisman | |
| 5,596,380 A | * | 1/1997 | Ozaki et al. | 352/30 |
| 5,701,171 A | | 12/1997 | Roy et al. | |
| 5,875,020 A | | 2/1999 | Kitten et al. | |
| 6,081,293 A | | 6/2000 | Brown et al. | |
| 6,137,530 A | * | 10/2000 | Brown | 348/96 |
| 6,457,827 B1 | * | 10/2002 | Groaser et al. | 352/166 |

FOREIGN PATENT DOCUMENTS

DE 686562 12/1939

* cited by examiner

Primary Examiner—Rodney Fuller
(74) Attorney, Agent, or Firm—Donald L. Wenskay, Esq.; Greenberg Traurig, LLP; Charles Berman, Esq.

(57) ABSTRACT

A film trap and gate assembly for use on a motion picture projector. The film trap includes an image aperture and a first and second trap rail assembly. The film trap further includes a stripper plate having an angled stripper blade attached to an attachment flange. The stripper blade is attached to the attachment flange at an at least one degree angle, preferably biased towards the trap body. The film gate includes a projection aperture and a first and second gate rail assembly. A film tensioning assembly is attached to the gate body, the film tensioning device having a deformable body disposing at least two tensioning rollers, and an adjustable tensioning device. When assembled, the film trap and gate assembly forms a film movement channel to guide the film past an illumination source, while reducing the contact between the film strip and the film trap and gate assembly. Consequently, the number of showing of a motion picture film is substantially increased.

64 Claims, 18 Drawing Sheets

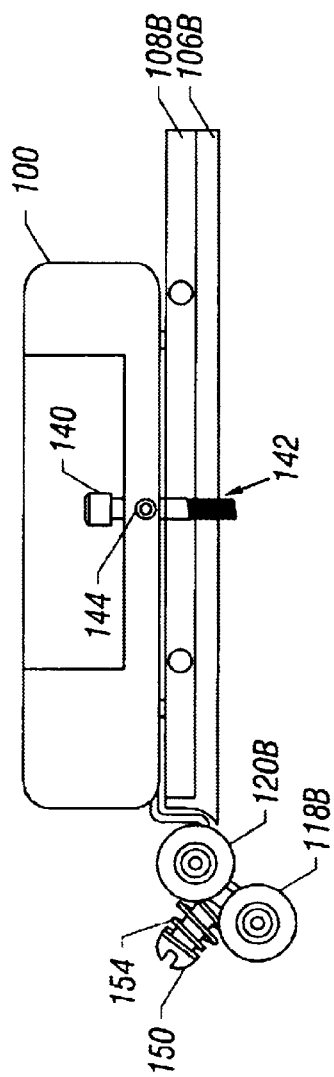
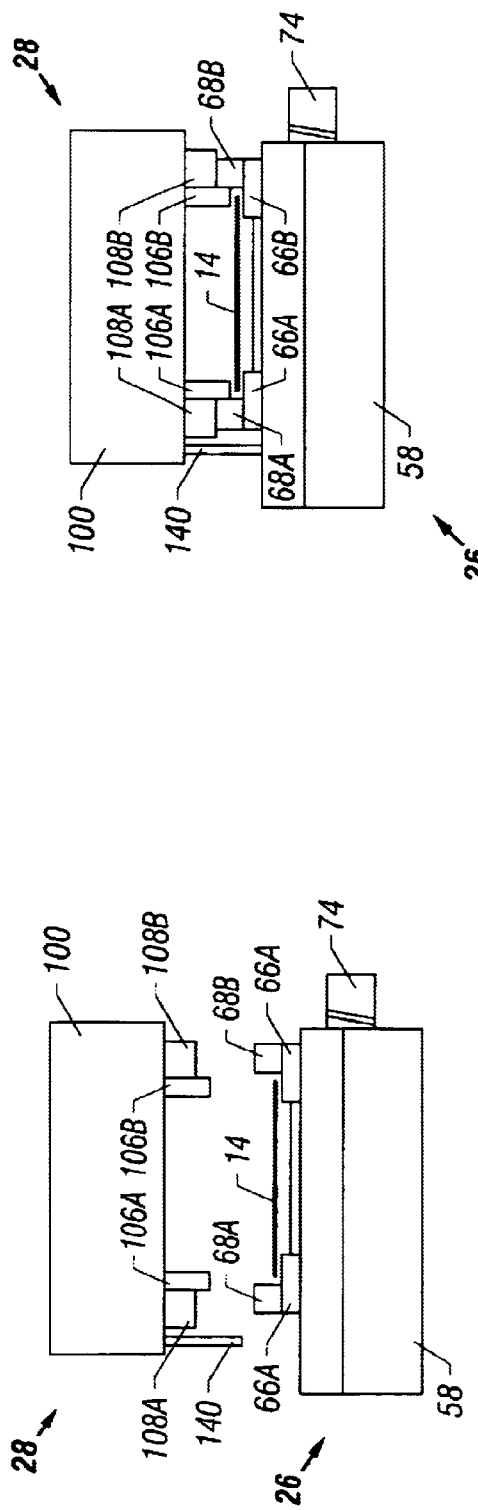
*FIG. 14A*
*FIG. 14B*
*FIG. 14C*

FILM TRAP AND GATE ASSEMBLY FOR A MOTION PICTURE PROJECTOR

BACKGROUND OF THE INVENTION

In motion picture projectors, a succession of transparent or semi-transparent still images or frames are sequentially advanced before a suitable light source, thereby projecting an image onto a projection surface. The film is moved or advanced until a frame is in alignment with the projection aperture and then held stationary for a discrete period of time during which light is passed during two discrete time periods through the aperture, film frame, and then a focusing lens, resulting in an image being projected onto a screen. This is followed by movement of the film until the next frame is in alignment with the projection aperture. The rapid sequential advancement of the individual still frames, typically on the order of 24 frames per second, produces the illusion of motion. Typically, the film disposes at least one soundtrack synchronized with the picture projection. In this regard, recent advances in analog and digital sound recording technology have been rapidly incorporated in to modern films and film projector sound systems, more commonly referred to as "sound heads".

To effectuate sequential film advancement, motion picture projectors utilize toothed drive sprockets connected to a motor driven "star wheel" to sequentially pull a length of film before the light source. Such motion picture projectors further include tensioning shoes for maintaining the filmstrip in contact with the drive sprockets. The film disposes two drive tracks which are engaged by the toothed sprockets, thereby enabling frame advancement. Motion picture filmstrips generally include at least one soundtrack positioned near the edge of the film or within at least one film drive track.

Commonly, motion picture projectors utilize a film trap and gate assembly to precisely align and position a filmstrip within an illumination plane. The film trap and gate assembly includes a pair of runners which provide controlled movement of the filmstrip past an illumination aperture. The edges of the filmstrip contact the runners, pressure bands, and tensioning shoes during operation. Consequently, over a period of time the edges of the filmstrip may become scratched or damaged due to the film remaining in constant contact with the runners, pressure bands, and tensioning shoes. Additionally, foreign materials such as dust, residues, and other impurities located on the runners, pressure bands, or tensioning shoes may be deposited on the film. The damage to the edges of the filmstrip or the foreign material deposited on the film may prevent the soundtracks from being clearly reproduced by the sound head.

Additionally, motion picture projectors are designed primarily for forward film advancement, in that the drive sprockets pull the filmstrip past an illumination aperture. On occasion, a film trap will include a sharpen device called a stripper plate located near the drive sprocket, to strip film splices when the film is moved through the projector in reverse. Pushing a flexible portion of film material past the sharpened stripper plate and past the runners, pressure bands, and tensioning shoes is often impossible. Moreover, severe damage to a filmstrip could occur should the filmstrip contact the stripper plate. As such, reversing the direction of the film, particularly while viewing, often results in damage to the film.

Thus, there is a need for a film trap and gate assembly for a motion picture projectors which reduces the amount of surface wear on the edges of the filmstrip, thereby increasing the lifetime of each film print. There is a further need for a film trap and gate assembly which enables the operator to reverse the direction of film travel without damaging the film.

BRIEF SUMMARY OF THE INVENTION

The present invention solves the need for a film trap and gate assembly which reduces the damage to a filmstrip disposed therein, thereby extending the usable lifetime of the motion picture. The film trap and gate assembly disclosed herein has eliminated the need for maintaining constant contact between the film and the spring-loaded runners, pressure bands, and steel tensioning shoes thereby reducing or eliminating any damage to the filmstrip. Additionally, the present invention permits an operator to reverse the direction of film movement through the projector, while viewing or at higher speed, without damaging the film. The present invention may be utilized on a en number of film projector systems with little or no modification required.

The film trap and gate assembly of the present invention comprises a film movement channel, which defines a discreet area which the film strip may traverse. The film movement channel, which is formed by the film gate engaging the film trap, forms and orifice larger than the thickness of the film disposed therein. Similarly, the width of the film movement channel is greater than the width of the film positioned therein. Unlike prior art systems, which utilized spring-loaded pressure bands located on the film trap which remain in constant contact with the film and forcibly bias the film against the film gate, the film movement channel of the present invention permits a degree of film movement or float within the channel. As a result, damage to the film has been reduced or eliminated while the usable lifetime of the filmstrip has been increased.

In an additional embodiment, the present invention discloses a film trap comprising a trap body having image aperture formed therein, and having a first and second trap rail assembly positioned thereon. The first trap rail assembly comprises a first trap rail in communication with a first trap guide. Similarly, the second trap rail assembly comprises a second trap rail in communication with a second trap guide. The film is positioned on the first and second trap rails. The amount of lateral displacement the film is limited by the first and second trap guides. Those skilled in the art will appreciate the present invention has eliminated the need for constant pressure applied by the spring-loaded pressure bands the film, thereby decreasing or eliminating damage to the film during operation.

Additionally, the present invention discloses a film tensioning device which is attachable to a film gate. The film tensioning device comprises a deformable body having at least tensioning roller attached thereto, and a tensioning device in communication with tensioning rollers. The deformable body may further comprise a roller cradle which positions the tensioning rollers on the deformable body. Those skilled in the art will appreciate the tensioning rollers of the present invention may be comprised of non-abrasive materials, including, without limitation, elastomers, urethanes, and rubbers. In another embodiment, the tensioning device may be actuated to adjust the tensioning force applied by the tensioning rollers.

In yet another embodiment of the present invention a film trap and gate system is disclosed herein. The film trap and gate system comprises a film trap capable of engaging a film gate. The film trap comprises a trap body having an image aperture formed thereon, and a first and second rail assembly attached thereto. The film trap further disposes a stripper plate comprising an angled stripper blade in communication with an attachment flange. The stripper plate is attached to the attachment flange at an at least one degree angle, thereby enabling the movement of the film to be reversed. The film gate comprises a gate body having a projection aperture formed therein, and a first and second rail assembly attached thereto. A film tensioning device is attached to the gate body. The tensioning device comprises a deformable body having an attachment orifice formed therein, an a roller cradle attached thereto. The attachment orifice preferably forms an attachment slot thereby enabling the user to adjust the length of the film tensioning device with respect to the gate body. At least tensioning rollers are in communication with the roller cradle. A tensioning device is in communication with the roller cradle such that the tensioning force applied by the tensioning device may be adjusted by the user.

In an alternate embodiment, the present invention discloses a film gate stripper plate for use in motion picture projectors. The stripper plate comprises a stripper blade attached to an attachment flange. The stripper plate is angled, preferably towards the gate body, at least one degree. Those skilled in the art will appreciate the present invention permits the movement of the film to be reversed without the film contacting the stripper blade, thereby reducing the likelihood of damaging the film.

In another embodiment, the present invention discloses a film trap and gate calibration device comprising a first member and a second member. The first member has a thickness greater than the thickness and width larger than motion picture film. The second member has a thickness and width smaller than the thickness of motion picture film. The operator may then position the trap and gate rails to be calibrated to be slightly larger or smaller than the motion picture film disposed thereon.

The present invention discloses a method of advancing motion picture film through a motion picture projector. The advancement method comprises locating film within a film projector, using the a film trap and gate assembly to form a film movement channel within the projector, positioning the film within the film movement channel, attaching the film to a film drive system, and moving the film through the film advancing channel. Those skilled in the art will appreciate the present method results in the film intermittently contacting the film trap, film gate, or both, rather than utilizing constant pressure commonly used in prior art system.

Other objects and further features of the present invention will become apparent from the following detailed description when read in conjunction with the attached drawings.

BRIEF DESCRIPTION OF THE DRAWINGS

FIG. 14a is a side view of the film gate of the present invention having a depth set device disposed thereon;

FIG. 14b is a bottom view of film trap and gate assembly of the present invention preparing to engage film;

FIG. 14c is a bottom view of film trap and gate assembly of the present invention preparing to engaging film;

DETAILED DESCRIPTION OF THE INVENTION

Disclosed herein is a detailed description of various illustrated embodiments of the present invention. This description is not to be taken in a limiting sense, but is made merely for the purpose of illustrating the general principles of the invention. The overall organization of the present detailed description is for the purpose of convenience only and is not intended to limit the present invention.

Those skilled in the art will appreciate the present invention incorporating a continuous trap rail assembly and continuous gate rail assembly has eliminated the need for spring-loaded runners and pressure bands which remain in constant contact with film disposed thereon. In addition, the present invention incorporates non-abrasive tensioning rollers rather than steel tensioning shoes, which are commonly used on prior art devices. As such, damage to the film 14 caused by the constant contact between the film trap and gate assembly 24 is reduced or eliminated resulting in an increase in film print lifetime. Additionally, the present invention further comprises an angled stripper plate, which enables a user to operate a projector in reverse, either while viewing or at higher speed (in excess of 24 frames per second).

Figure 1:
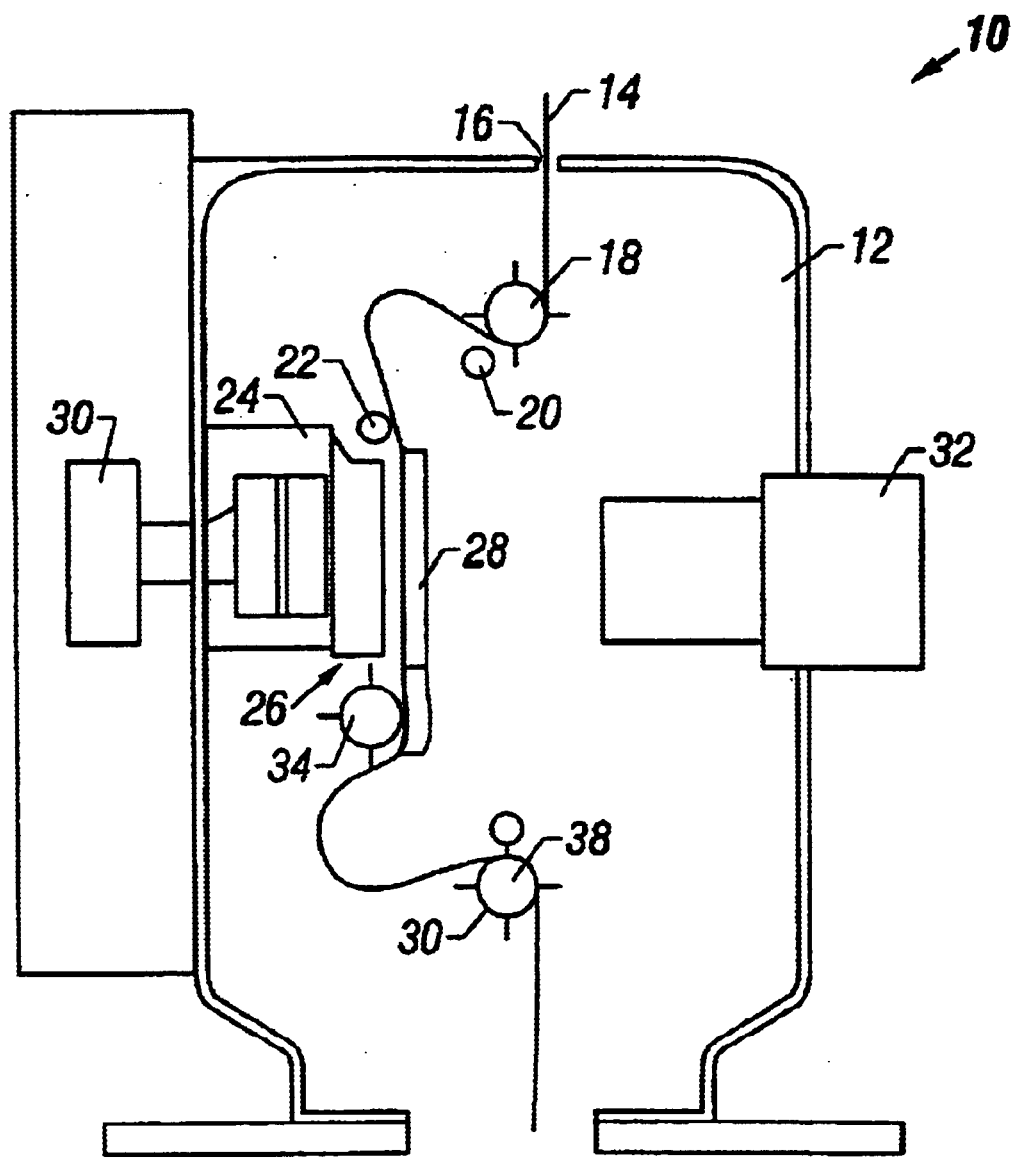
FIG. 1 is a schematic view of a film projector showing motion picture film threaded through the projector.

A conventional motion picture projector for use with the present invention is shown in FIG. 1. The projector 10 has a compartment 12 which receives motion picture film 14 through an opening 16. The film 14 engages a feed sprocket 18 and advances between the feed sprocket 18 and the feed roller 20. The film then engages a roller 22 and is positions the film for entering the film trap and gate assembly 24. The film trap and gate assembly 24 is comprised of a film trap 26 and a gate 28 which position the film 14 between an illumination source 30 and a projection assembly 32. The film emerges from the film trap and gate assembly 24 and engages a receiving sprocket 34. The film continues between a second feed sprocket 36 and a second roller 38, and exits the projector 10.

Figure 2:
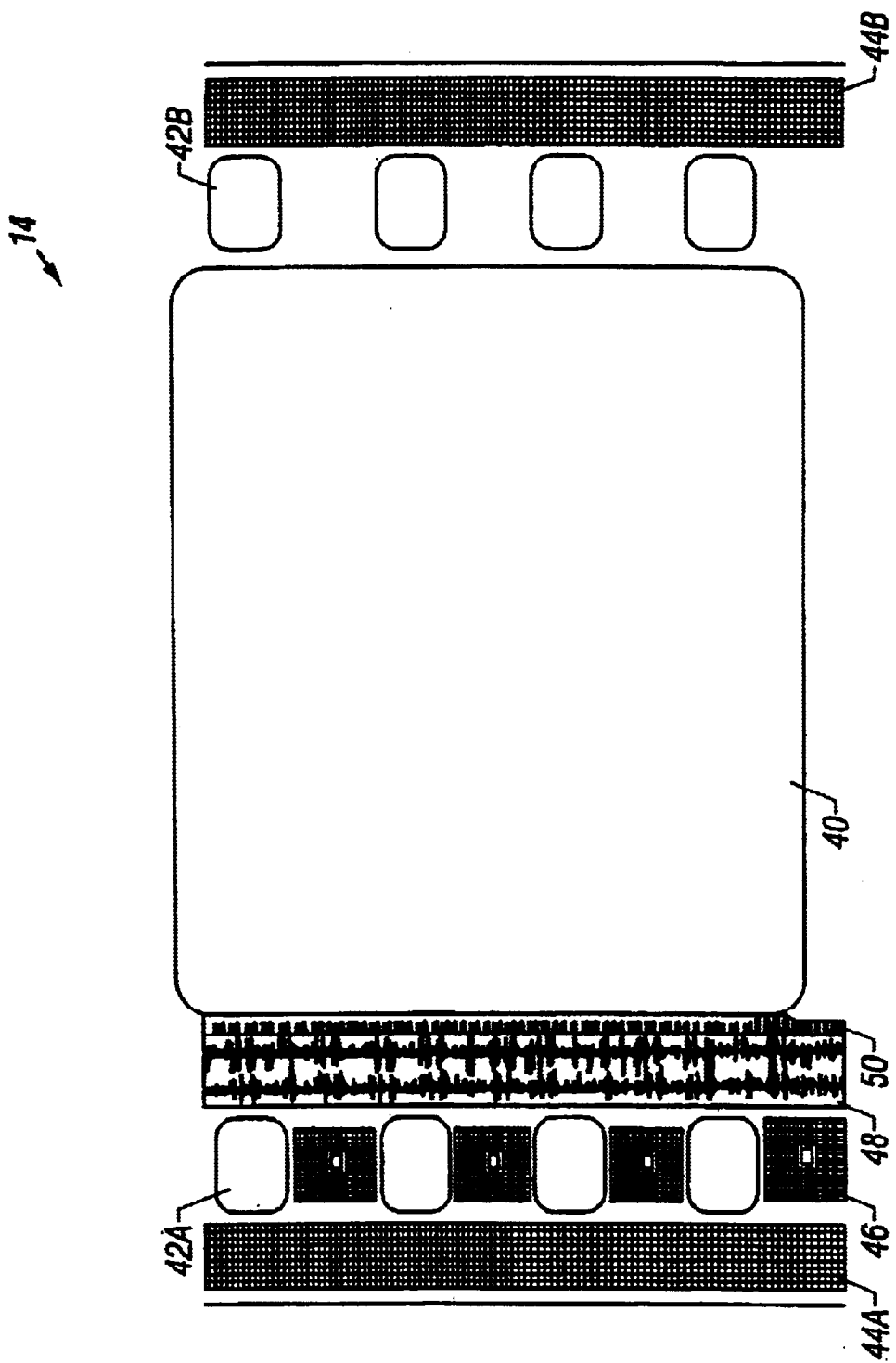
FIG. 2 is an enlarged side view of motion picture film having multiple soundtracks disposed thereon.

With reference to FIG. 2, motion picture film 14 generally comprises an image area 40 positioned between a first drive track 42a and a second drive track 42b. At least one soundtrack is positioned proximate the drive tracks 42a and 42b. The film 14 shown in FIG. 2 comprises four soundtracks, enabling use of the film 14 with various projection systems or sound heads. As shown, the film comprises a SDDS digital soundtrack 44a and 44b; a SRD digital soundtrack 46; an analog soundtrack 46; and a DTS digital soundtrack.

Figure 3:
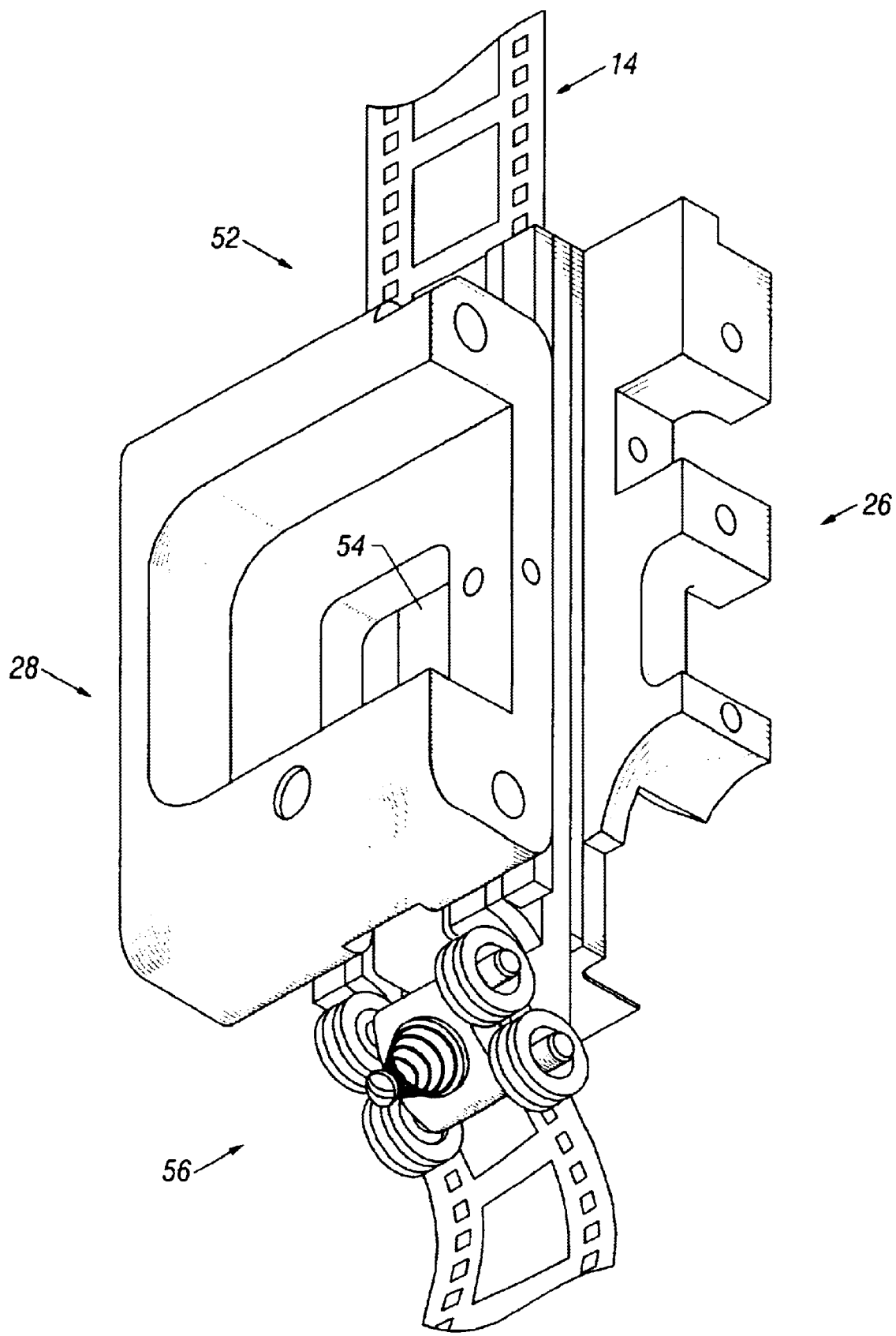
FIG. 3 is a perspective view of the film trap and gate assembly of the present invention having motion picture film disposed therein.

Referencing FIG. 3, the film trap and gate assembly 24 is shown engaging a portion of motion picture film 14. The film trap and gate assembly 24 comprises a film trap 26 and a film gate 28. During operation, the film 14 enters the first end 52 of the film trap and gate assembly 24 and an image is projected through the projection aperture 54. The film 14 and exits the through the second end 56 of film trap and gate assembly 24. Those skilled in the art will appreciate the present invention may be manufactured from a plurality of materials including, but not limited to, cast iron, steel, aluminum, reinforced plastic, urethane, rubber or any other useful material. Alternatively, the present invention may be manufactured from a plurality of materials. For example, the film trap 26 may utilize a relatively rigid material such as steel in one aspect, and a relatively flexible material such a urethane in another aspect.

Figure 4:
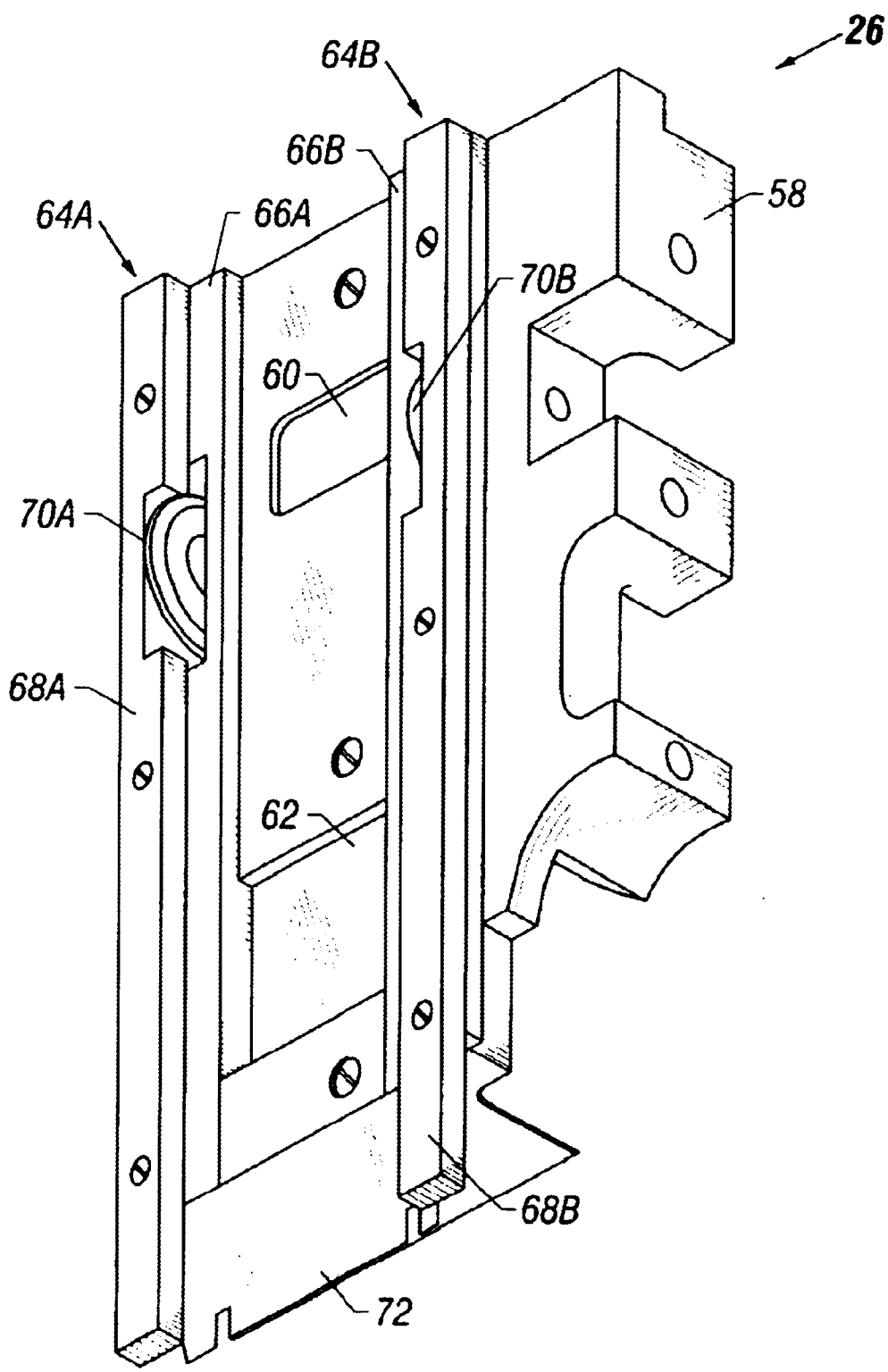
FIG. 4 is a perspective view of the film trap of the present invention.
Figure 5:
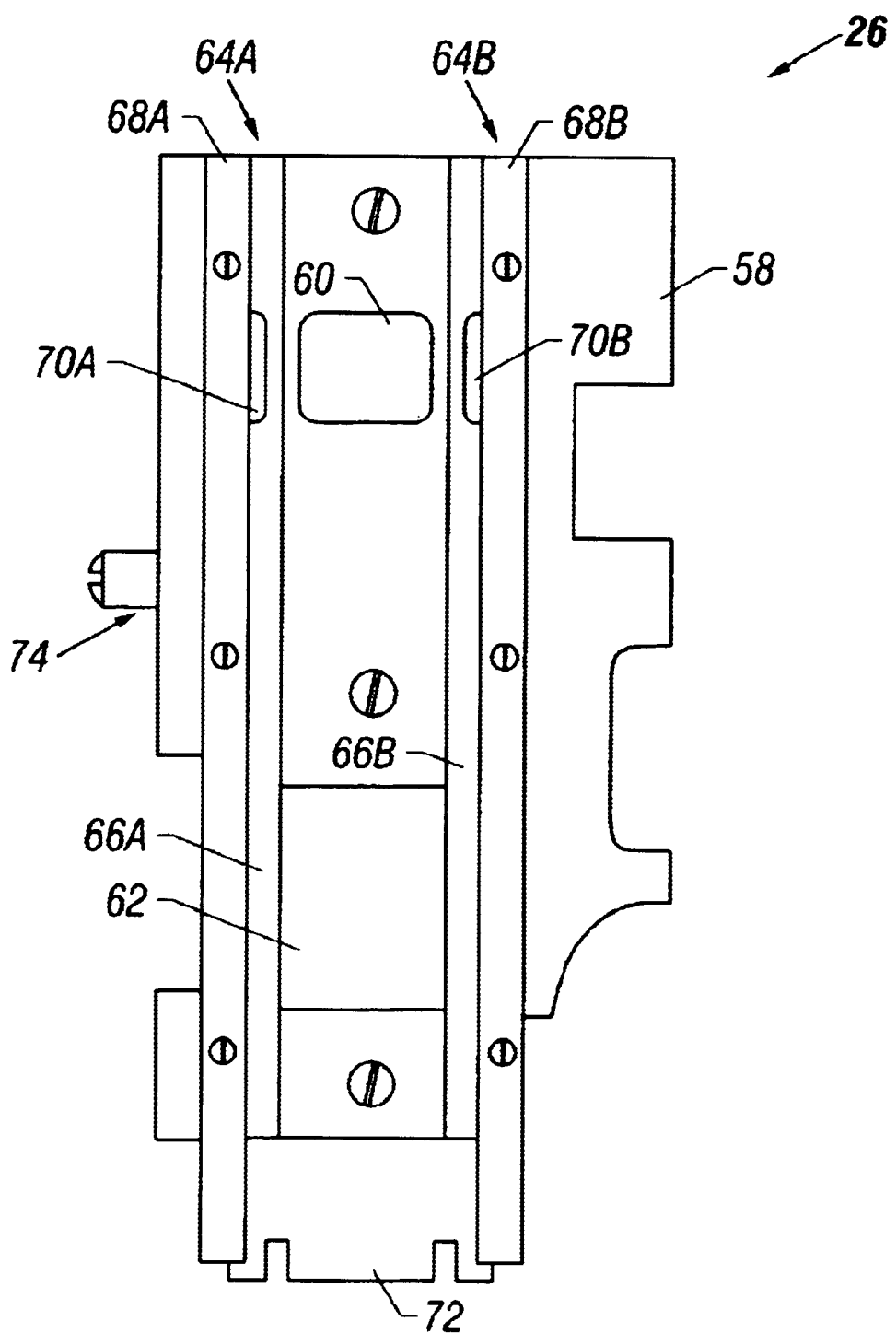
FIG. 5 is a top view of the film trap of the present invention.

With reference to FIGS. 4 and 5, the film trap 26 of the present invention comprises a trap body 58 having two apertures 60 and 62, respectively, formed therein, and having two trap rail assemblies 64a and 64b attached thereto. The first trap rail assembly 64a comprises a first trap rail 66a and a first trap guide 68a, and further disposes a first movable guide roller 70a. Similarly, the second rail assembly 64b comprises a second trap rail 66b and a second trap guide 68b, and further disposes a second movable guide roller 70b. A stripper plate 72 is attached to the trap body 58 and is positioned between the first and second trap rail assemblies 64a and 64b. As shown in FIG. 5, the trap body 58 further comprises a trap attachment pin 74, which attaches the film trap 26 to the projector 10 (not shown).

Figure 6:
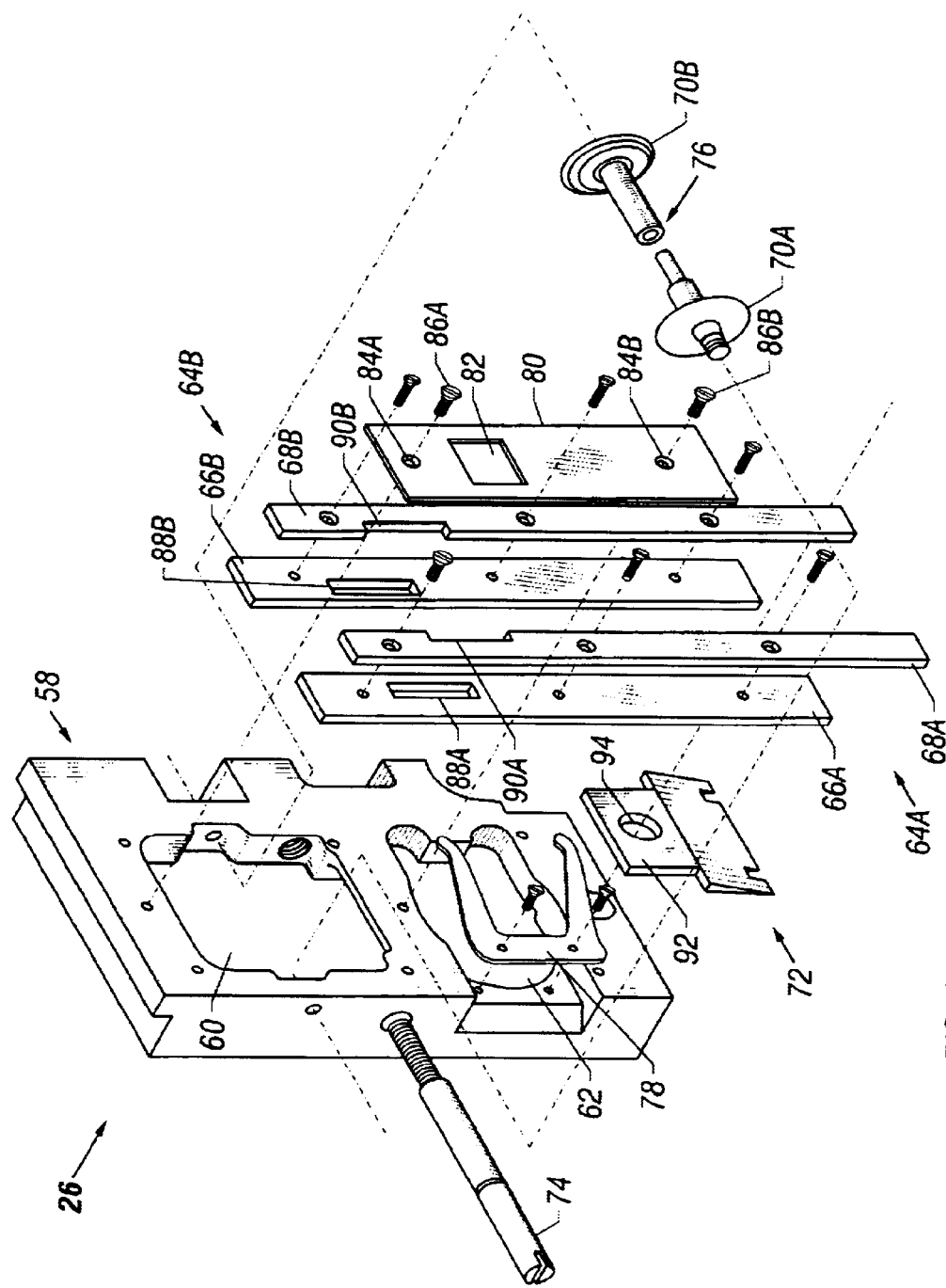
FIG. 6 is an exploded view of the film trap of the present invention.

FIG. 6 shows an exploded view of the film trap 24 of the present invention. As shown, the first guide roller 70a and second guide roller 70b are positioned on a guide roller shaft 76 which is positioned within the first aperture 60 of the film trap 26. The plate spring 78 is attached to the film trap 26 such that the plate spring 78 is positioned within the second aperture 62. A plate 80 having an aperture 82 and having screw receivers 84a and 84b formed therein attaches to the trap body 58 with screws 86a and 86b, and is positioned over the first aperture 60 and partially occludes the second aperture 60. As shown in FIG. 6, a first guide roller receiver 88a is formed in the first trap rail 66a, and a first guide roller recess 90a is formed in the first trap guide 68a. When assembled, the first rail assembly 64a, comprised of the first trap rail 66a and first trap guide 68a, is adapted to receive the first movable guide roller 70a through the first guide roller receiver 88a and recess 90a. Similarly, a second guide roller receiver 88b is formed in the second trap rail 66b, and a second guide roller recess 90b is formed in the second trap guide 68b. When assembled, the second rail assembly 64b, comprised of the second trap rail 66b and second trap guide 68b, is adapted to receive the second movable guide roller 70b through the second guide roller receiver 88b and recess 90b. The second aperture 62 is further occluded by the attachment flange 92 of the stripper plate 72. The stripper plate comprises a stripping blade 94 integral to the attachment flange 92, and an attachment orifice 96 formed in the attachment flange 92. The stripper plate 72 is attached to the trap body 58 with a flange screw 98.

Figure 7A:
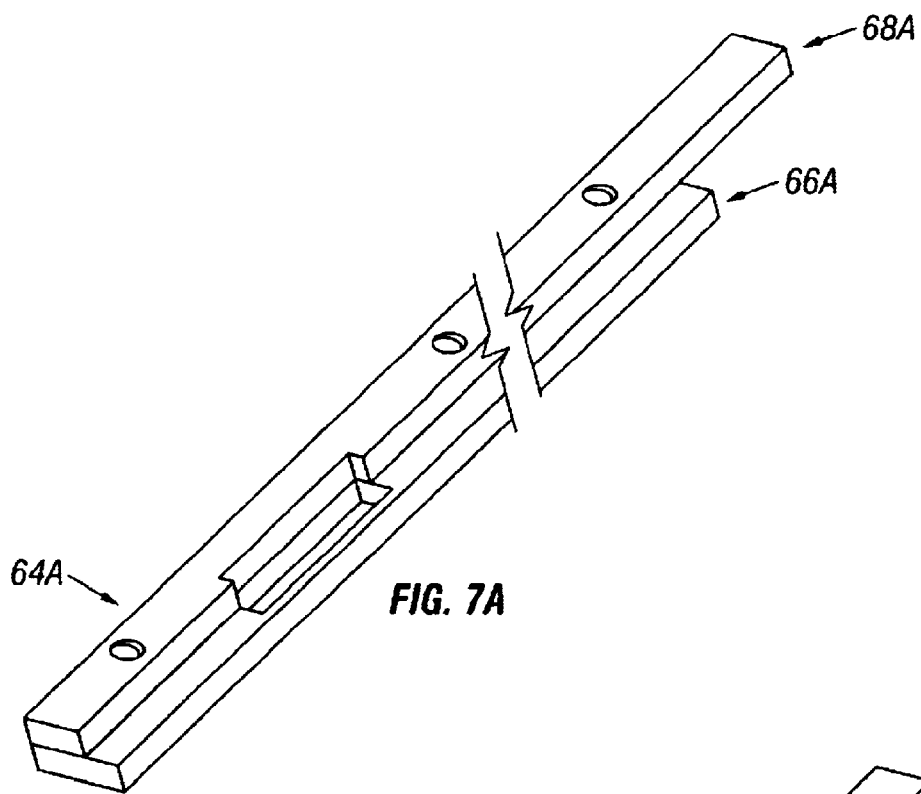
FIG. 7a is a perspective view of an embodiment of the first trap rail assembly of the present invention.
Figure 7B:
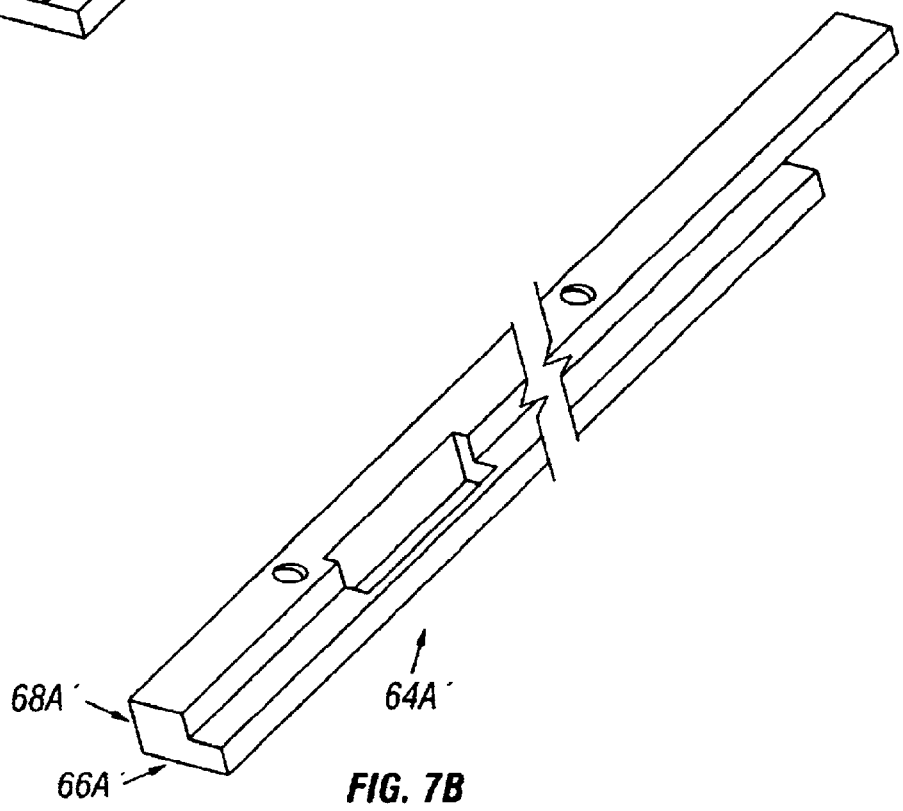
FIG. 7b is a perspective view of alternate embodiment of the first trap rail assembly of the present invention.

With reference to FIGS. 7a and 7b, the present invention discloses several embodiments of rail assemblies which may be used with the film trap 26. FIG. 7a shows a first rail assembly 64a comprised of a first film rail 66a and a separate first film guide 68a. In an alternate embodiment, FIG. 7b shows a first rail assembly 64a' having a first film rail 66a' integral to the first film guide 68a'. Those skilled in the art will appreciate the continuous rail designs of the present invention eliminates the need for the spring-loaded runners found in present designs, thereby reducing wear and damage to the film.

Figure 8A:
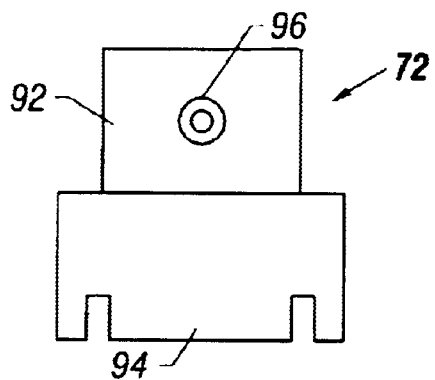
FIG. 8a is a top view of the stripper plate used on the film trap of the present invention.
Figure 8B:
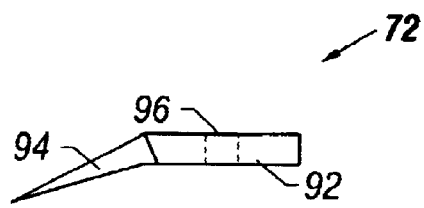
FIG. 8b is a side view of the stripper plate used on the film trap of the present invention showing the angled stripper blade.
Figure 8C:
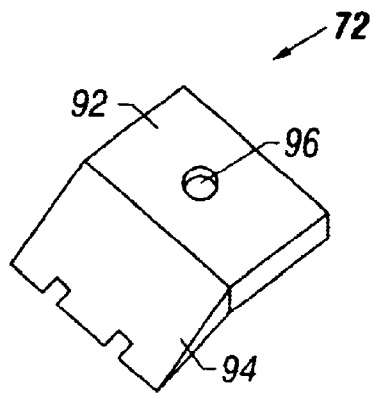
FIG. 8c is a perspective view of the stripper plate used on the film trap of the present invention.

FIGS. 8a–8c show various views of the stripper plate of the present invention. The stripper plate 72 comprises an attachment flange 92 and a stripper blade 94 which is integral to the attachment flange 92. As shown in FIG. 8b, the stripper blade 94 is attached to the attachment flange 96 at an angle. The angled stripper blade 94 of the present invention reduces the likelihood the film 14 will contact the blade portion 94 of the stripper 52, thereby enabling the user to operate the projector 10 in reverse.

Figure 9:
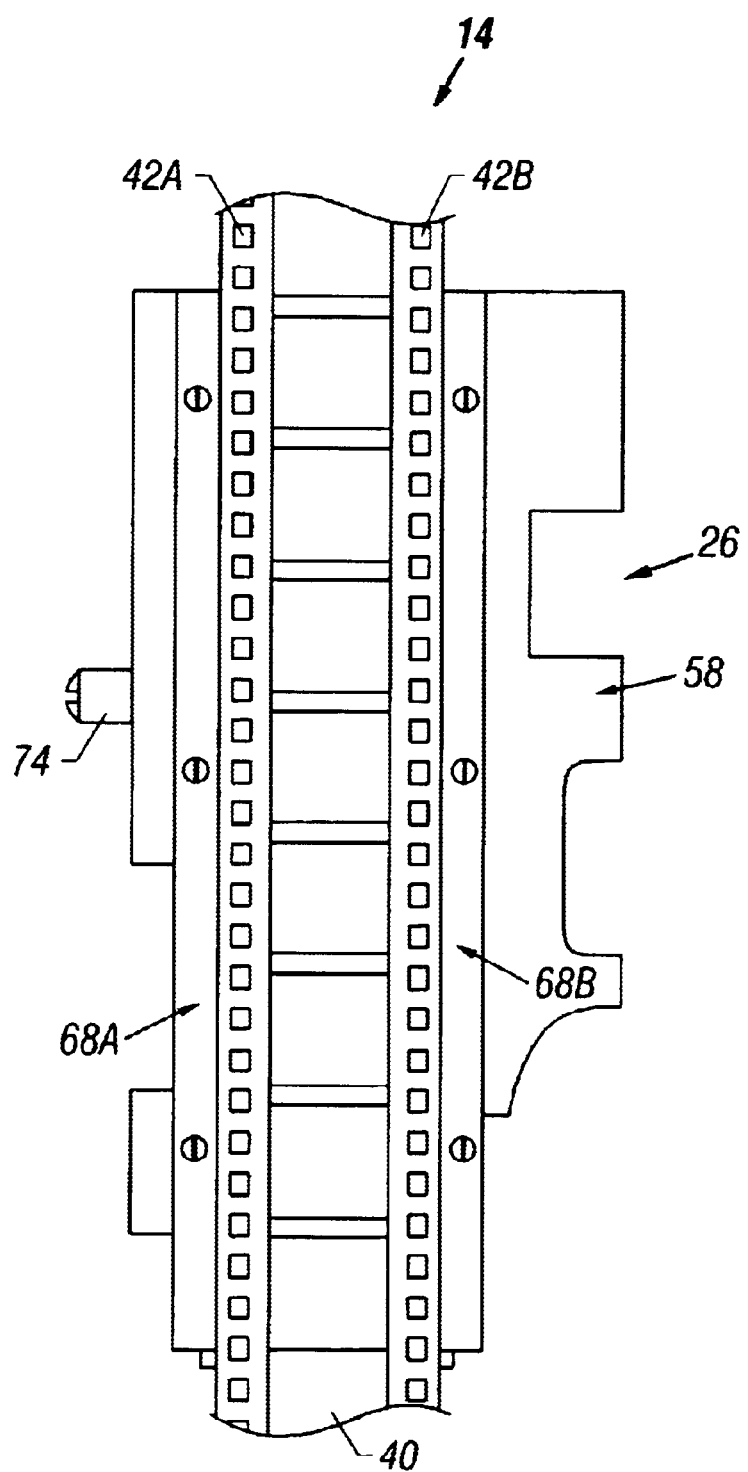
FIG. 9 is a top view of the film trap of the present invention having motion picture film disposed thereon.

Referencing FIG. 9, a film trap 26 is shown having a portion of film 14 disposed thereon. As shown, the film drive tracks 42a and 42b are positioned on the trap rails 66a and 66b (not shown) between the trap guides 68a and 68b such that the film image area 40 is positioned over the first aperture 60 formed in the trap body 58. The trap guides 68a and 68b restrict the amount of lateral displacement achievable by the film 14 during operation, thereby stabilizing the image projected on a screen (not shown).

Figure 10:
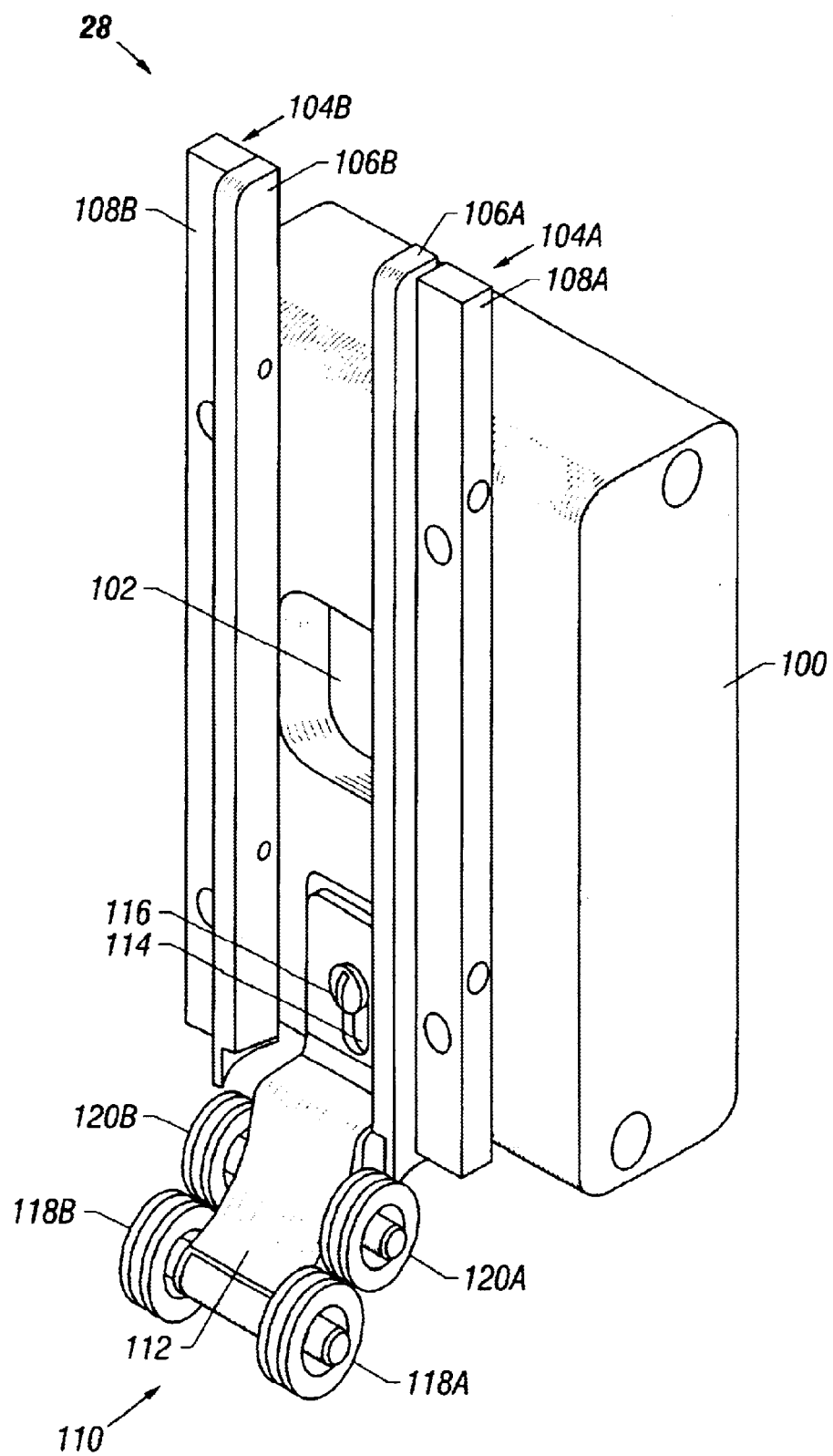
FIG. 10 is a perspective view of the film gate of the present invention.
Figure 11:
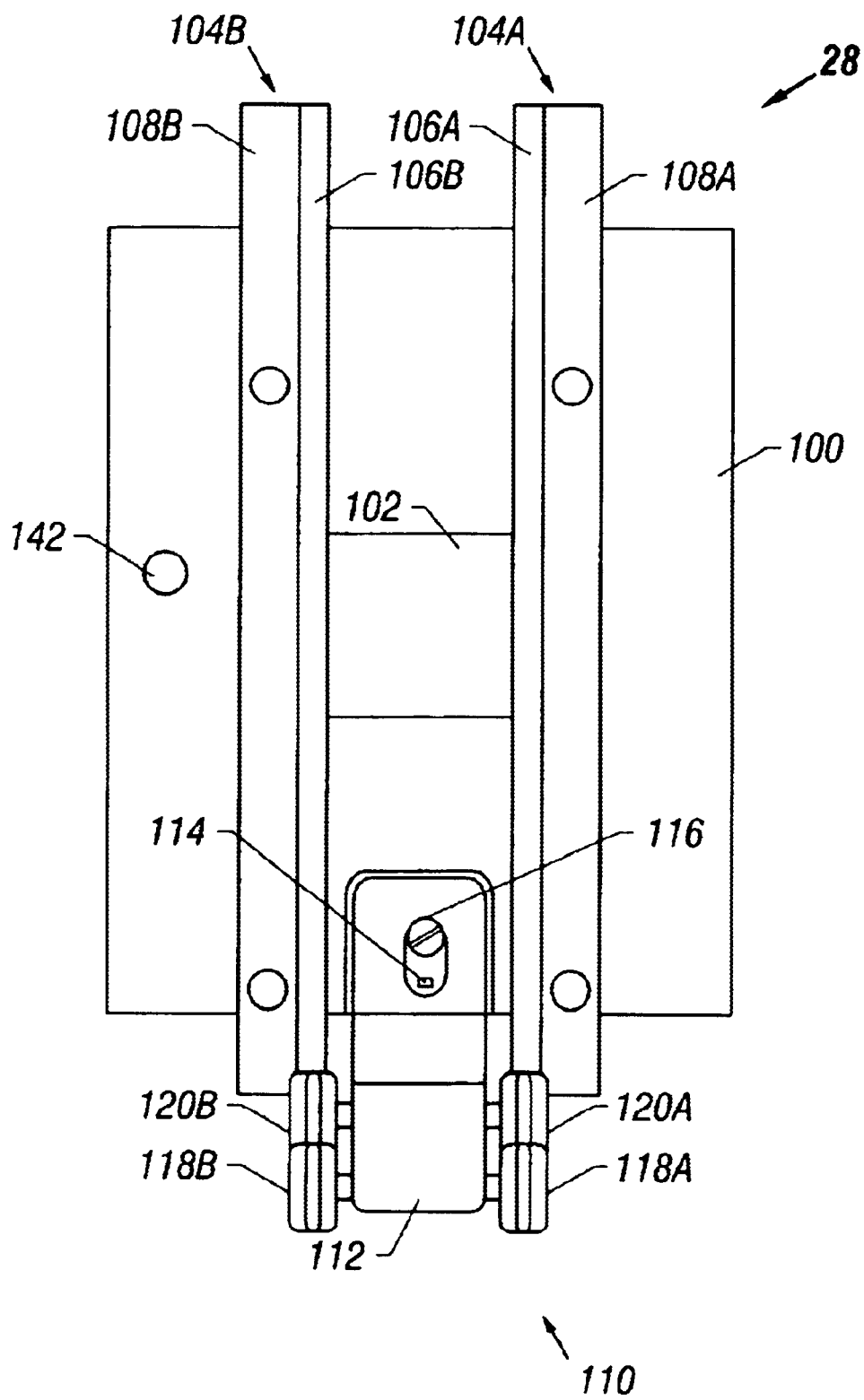
FIG. 11 is a top view of the film gate of the present invention.

FIGS. 10 and 11 show the film gate 28 of the present invention. The film gate 28 comprises gate body 100 having a gate aperture 102 formed therein, and having two gate rail assemblies 104a and 104b attached thereto. The first gate assembly 104a comprises a first gate rail 106a attached to a first gate guide 108a. Similarly, the second gate assembly 104b comprises a second gate rail 106b attached to a second gate guide 108b. The film gate 28 further disposes a film tensioning assembly 110 comprising a deformable body 112 having an attachment slot 114 formed therein. An attachment screw 116, positioned within the attachment slot 114, is used to attach the tensioning assembly 110 to the gate body 100. The deformable body 112 further comprises first tensioning rollers 118a and 118b, and second tensioning rollers 120a and 120b. As shown in FIG. 11, the film gate 28 further comprises a depth set orifice 142, which will be discussed in detail below.

Figure 12:
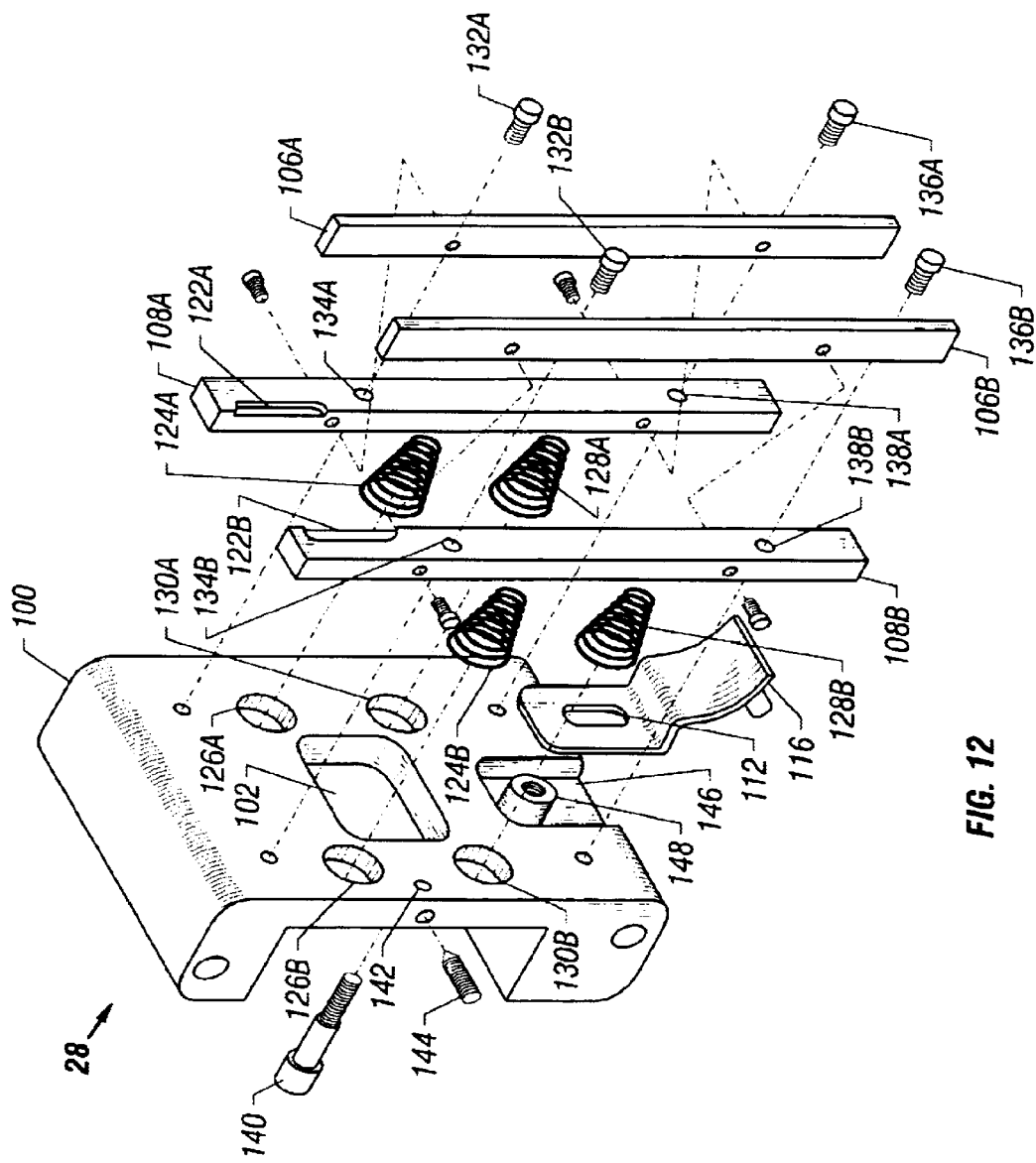
FIG. 12 is an exploded view of the film gate of the present invention.

Referencing FIG. 12, an exploded view of the film gate 28 of the present invention shown. As shown, the first rail springs 124a and 124b are positioned with the first rail spring receivers 126a and 126b. Similarly, the second rail springs 128a and 128b are positioned within the second rail spring receivers 130a and 130b. The first rail assembly 104a, which comprises a first gate rail 106a and a first gate guide 108a, is positioned on the gate body 100 covering the first rail spring 124a and second rail spring 128a. Thereafter, the first rail assembly 104a is attached to the gate body 28 with the first and second assembly screws 132a and 136a, respectively, positioned within first and second assembly orifices 134a and 138a, respectively, formed in the first gate rail 108a. Similarly, the second rail assembly 104a, which comprises a second gate rail 106b and a second gate guide 108b, is positioned on the gate body 100 covering the first rail spring 124b and second rail spring 128b. Thereafter, the second rail assembly 104b is attached to the gate body 28 with the first and second assembly screws 132b and 136b, respectively, positioned within first and second assembly orifices 134b and 138b, respectively, formed in the second gate rail 108b. A depth set device 140 is positioned within a depth set orifice 142 formed in the gate body 100. The depth set device 140 permits an operator to precisely control the clearance between the trap 26 (not shown) and gate 28 when assembled. A depth set pin 144 may be used to set the depth. The gate body 100 further comprises a tensioning assembly receiver 146 having a mounting receiver 148 disposed therein. The deformable body 112 attaches to the gate body with screw 116 which is positioned within the attachment slot 114. Those skilled in the art will appreciate the deformable body 112 enables the operator to precisely position the film tensioning member 110 in relation to the stripping plate 72, thereby limiting the contact between the film 14 and the stripping plate 72 and tensioning rollers 118a–b, and 120a–b. The deformable body 112 may be manufactured from a plurality of materials including, without limitation, aluminum, steel, or other material. In an alternate embodiment, the deformable body 112 may be manufactured from a rigid material. The components of the film tensioning assembly 110 will be discussed in detail below.

Figure 13A:
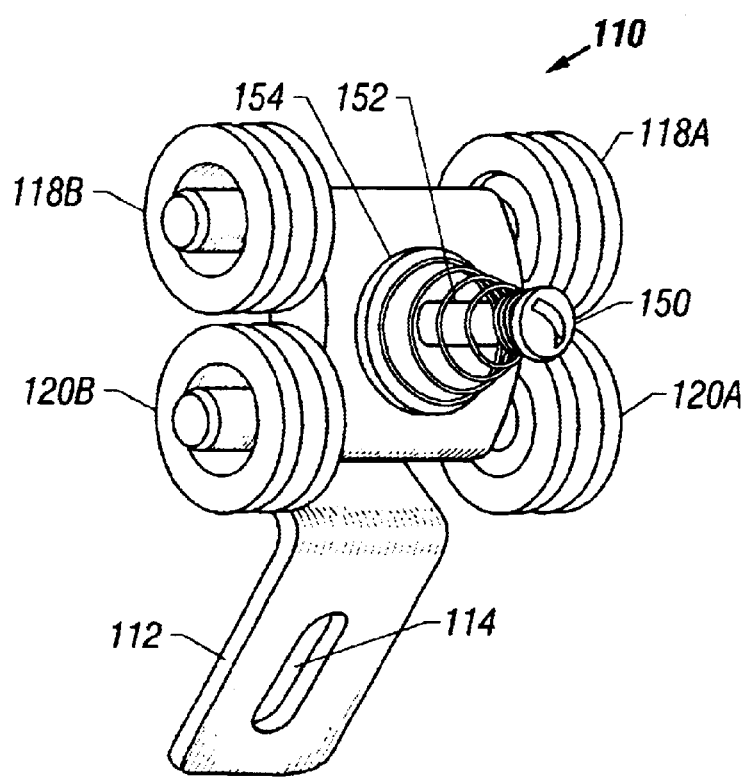
FIG. 13a is a perspective view of the film tensioning assembly of the present invention.
Figure 13C:
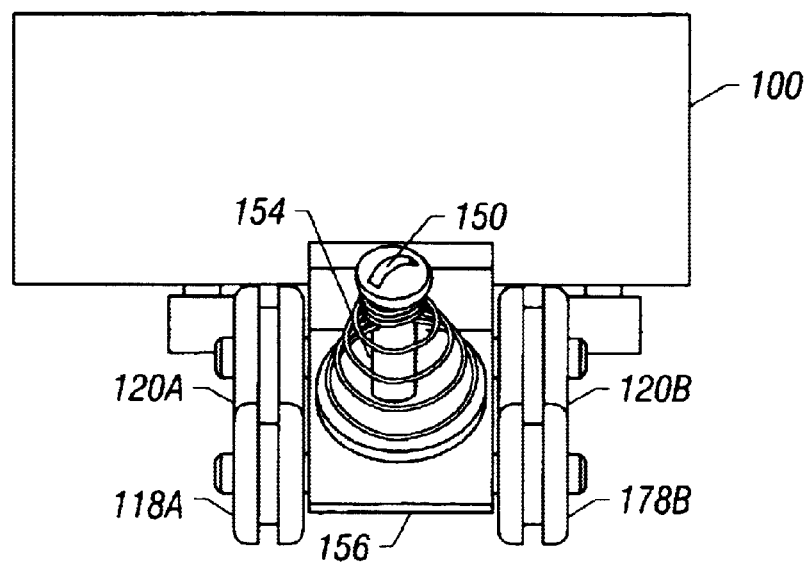
FIG. 13c is a bottom view of the film tensioning assembly of the present invention.
Figure 13B:
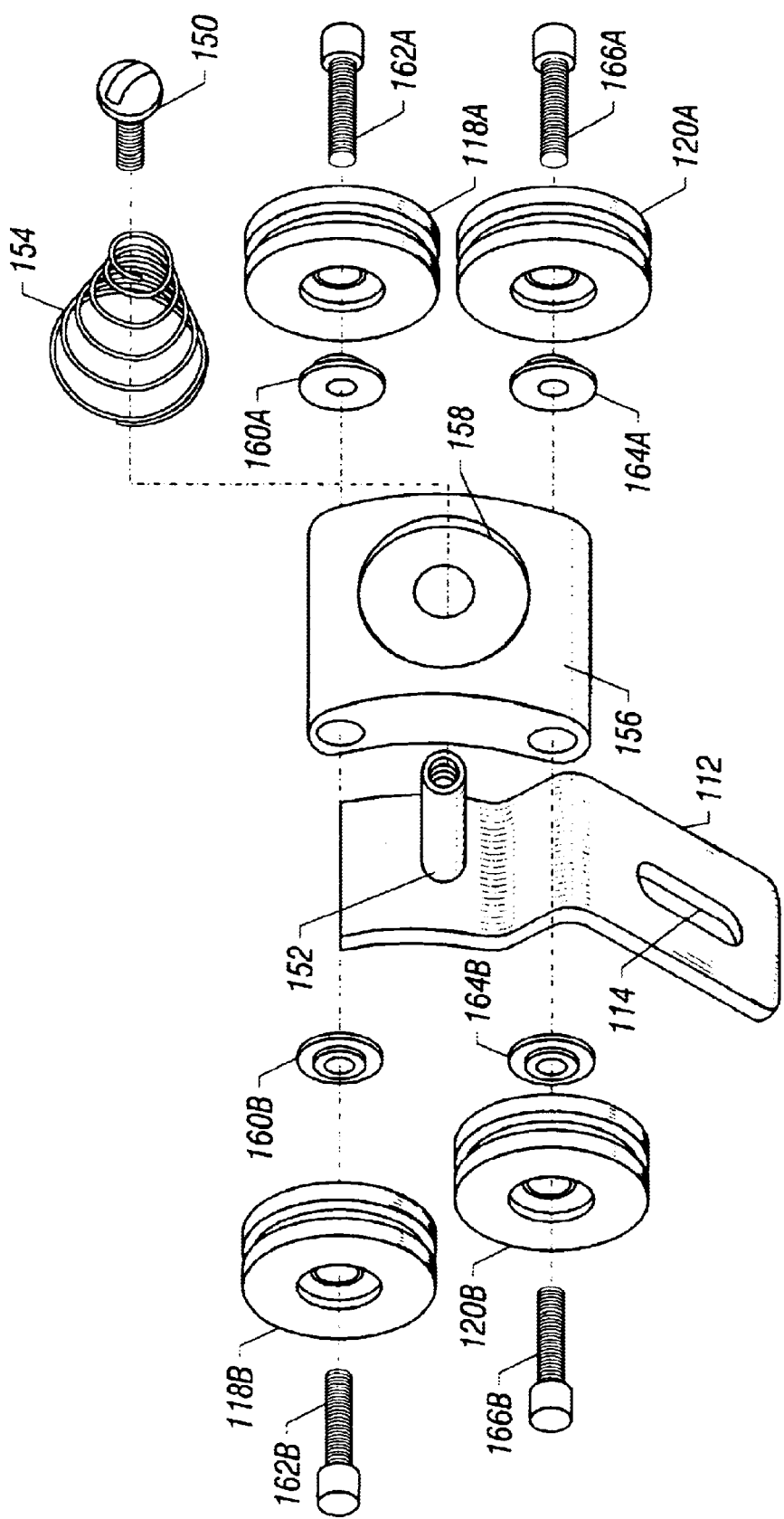
FIG. 13b is an exploded view of the film tensioning assembly of the present invention.
Figure 15:
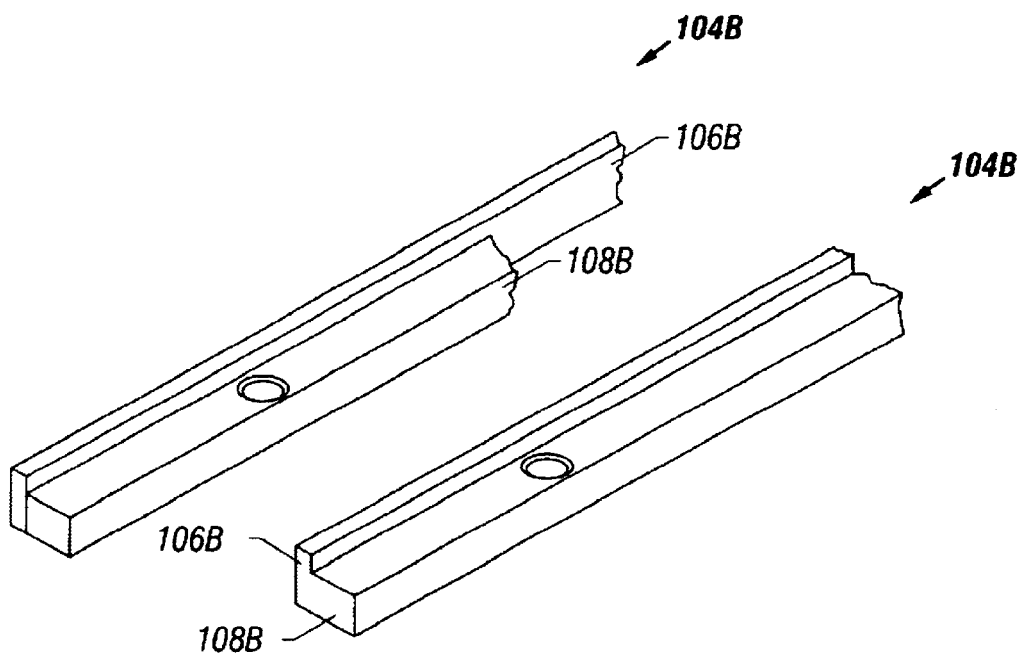
FIG. 15a is a perspective view of an embodiment of the second gate rail assembly of the present invention.
FIG. 15b is a perspective view of alternate embodiment of the second gate rail assembly of the present invention.

FIGS. 13a–13c show the film tensioning assembly 110 of the present invention. The film tensioning assembly 110 comprises a deformable body 112 having an attachment slot 114 formed therein, and having a tensioning screw receiver 152 disposed thereon. A roller cradle 156, positioned over the tensioning screw receiver 152 and receiving a tensioning device 154 within a tensioning device receiver 158, is attached to the deformable body 112 with a tensioning screw 150. In use, the tensioning device 154 exerts an adjustable biasing force to the roller cradle 156, thereby permitting the user to adjust the amount of force applied to the film 14 by the tensioning rollers 118a–b and 120a–b. By actuating the tensioning screw 150, the user increases the force applied by the tensioning device 154 to the roller cradle 156, resulting in the tensioning rollers 118a–b and 120a–b applying more force. The first tensioning rollers 118a and 118b, respectively, receive the first roller bearings 160a and 160b, respectively, and are attached to the roller cradle 156 with first roller screws 162a and 162b, respectively. Similarly, the second tensioning rollers 120a and 120b, respectively, receive the second roller bearings 164a and 164b, respectively, and are attached to the roller cradle 156 with first roller screws 166a and 166b, respectively. FIG. 13c shows the film tensioning assembly 110 of the present invention attached to the film gate 28. In contrast to prior art systems, which utilize a steel tensioning shoes which contact and damage film 14, the film tensioning member 110 of the present invention incorporates non-abrasive materials. Those skilled in the art will appreciate the first tensioning rollers 118a and 118b, and second tensioning rollers 120a and 120b, may be manufactured from a plurality of materials, including, without limitation, elastomer, urethane, rubber, silicon, or other non-abrasive material. Alternatively, the film tensioning device may be incorporate friction reducing materials, such as Teflon.

With reference to FIGS. 14a-14, the gate 28 comprises a depth set device 140 positioned within a depth set orifice 142. The depth set device permits the operator to ensure sufficient film clearance between the film trap 26 (not shown) and the film gate 28 is maintained, thereby forming a film movement channel. The operator advances the depth set device 140 such that when the film gate 28 is positioned on the film trap 26 the depth set device 140 contacts the trap body 58 wherein sufficient film clearance remains between the trap rails 66a and 66b, and the gate rails 106a and 106b. FIG. 14b shows the film 14 located on the first and second trap rails 66a and 66b of the film trap 26. The film gate 28 is positioned thereabove. FIG. 14c shows the film gate 28 engaging the film trap 26. FIG. 14c shows the film 14, disposed within the film movement channel 168 formed by the trap rail assembly 64 and the gate rail assembly, non-biased and free to traverse the film movement channel 168.

Figure 15A:
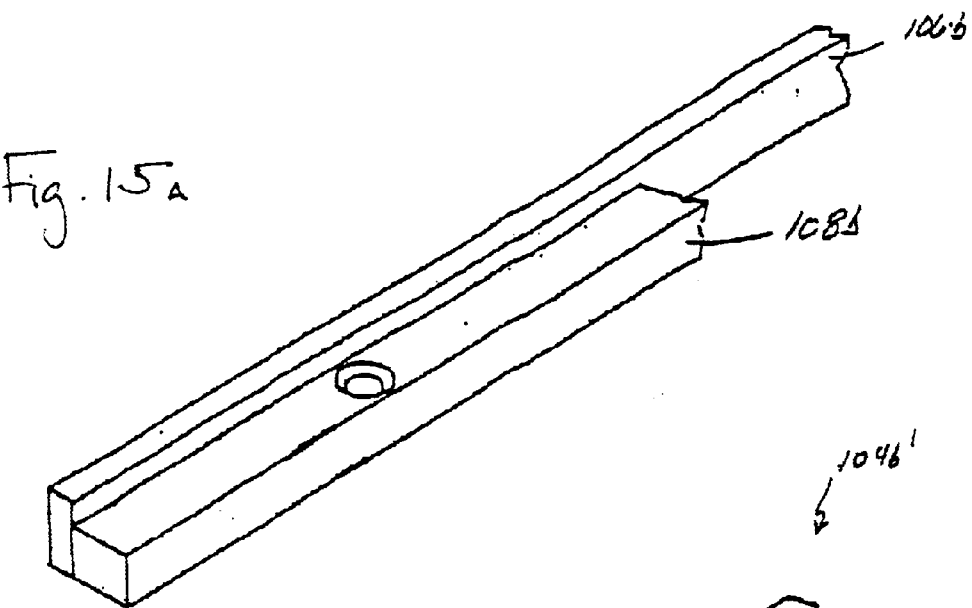
Figure 15B:
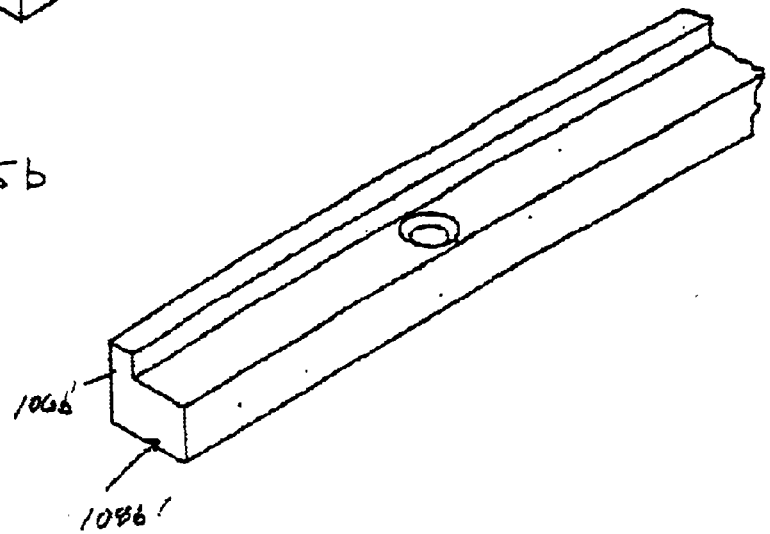

FIGS. 15a and 15b show various embodiments of the rail assembly 104b of the present invention. As shown in FIG. 15a, the present invention discloses a rail assembly 104b comprising a second gate rail 106b attached to a separate second rail guide 108b. In an alternate embodiment, FIG. 15b shows a rail assembly 104b' comprising a second rail portion 106b' integral to a second gate guide 108b'. Similarly, the first rail assembly 104a may comprise either a separate second rail/guide assembly or an integral rail/guide assembly. The continuous gate rail assembly of the present invention cooperatively engages the continuous trap rail assembly thereby defining a discrete film pathway therebetween.

Figure 16A:
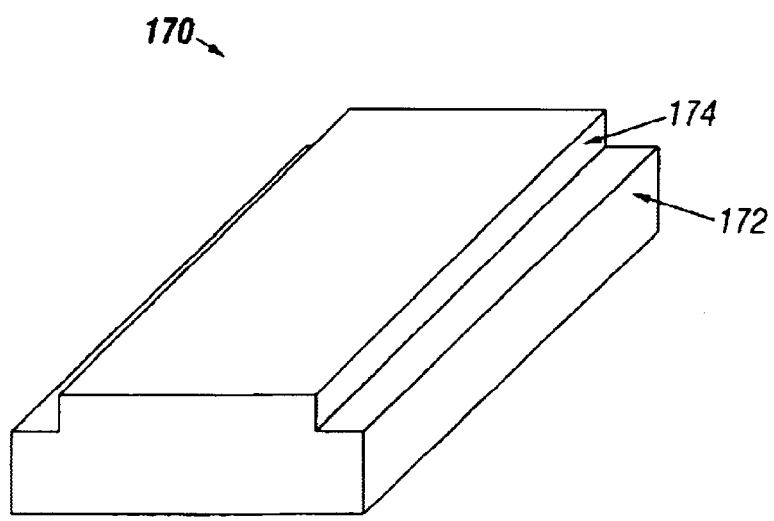
FIG. 16a is a perspective view of the calibration device used to calibrate the film trap and gate assembly of the present invention.
Figure 16B:
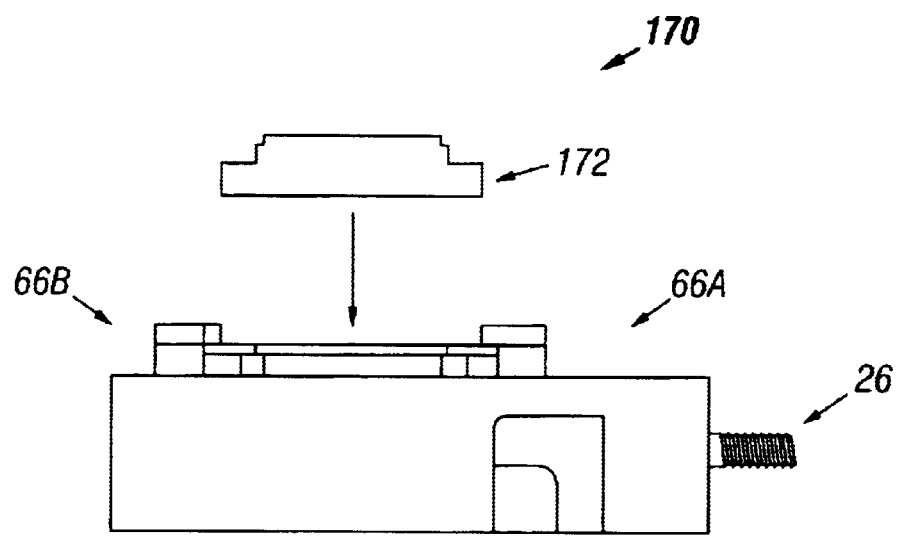
FIG. 16b is a side view of the calibration device being used to calibrate the film trap of the present invention.
Figure 16C:
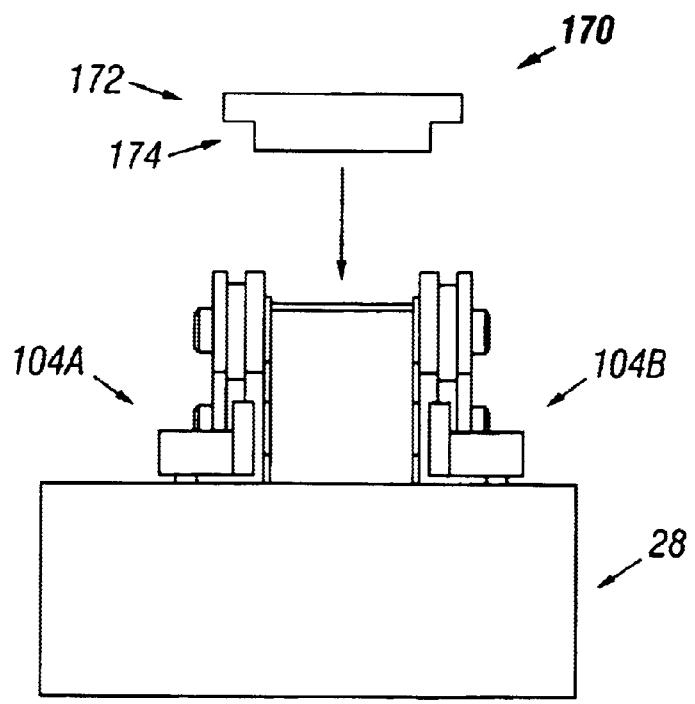
FIG. 16c is a side view of the calibration device being used to calibrate the film gate of the present invention.

The present invention further discloses a calibration device for use with the present film trap and gate assembly 24. As shown in FIGS. 16a–c, the calibration device 170 comprises a trap plate portion 172 and a gate plate portion 174 attached thereto. The trap plate portion 172 is manufactured with a width slightly, e.g. 0.005 inch, larger to the width of film 14. To calibrate the trap 26, the user positions the calibration device 170 on the film trap 26 such that the trap plate portion 172 is located between the trap rail assemblies 64a and 64b and in communication with the plate 80. The trap rail attachment screws are then tightened. Similarly, the calibration device 170 may be used to calibrate the gate rail assembly 104a and 104b. The gate plate portion 174 is placed on the gate 28 such that gate plate portion 174 is positioned between and in communication with the gate rail assemblies 104a and 104b. The rail attachment screws 132a–b and 136a–b are then tightened. The gate plate portion 174 is manufactured with a width slightly, e.g. 0.005 inch, smaller than the width of the film 14. Those skilled in the art will appreciate the present calibration device 170 permits the user to easily calibrate the film trap and gate assembly 24 without the plurality of sizing shims commonly required with present trap-gate systems.

The present invention further discloses a method of using the film trap and gate assembly 24. As shown in FIG. 1, the trap 26 and gate 28 are positioned within a film projector 10 such that the trap first aperture 60 and gate aperture 102 are positioned between the light source 30 and projection system 32. Those skilled in the art will appreciate the present invention may replace existing film trap and gate assemblies for a plurality of film projection systems with little or no modification required. As shown in FIG. 3, with the film trap 26 and gate 28 are positioned within the film projector 10, the film 14 is positioned on the first and second trap rails 66a and 66b. The film 14 is then made to engage the drive system sprockets 18, 34, and 36, respectively. The film gate 28 is made to engage the film trap 26, such that the first and second gate rails 106a and 106b are positioned proximate the film 14 disposed on the trap first and second rails 66a and 66b. The depth set device 140, positioned on the film gate 28, may then be actuated to ensure sufficient clearance between to the trap rails 66a and 66b, and gate rails 106a and 106b is present to permit free longitudinal movement of the film 14 positioned therebetween. The trap guides 68a and 68b, and gate guides 108a and 108b, assist in positioning and seating the trap 26 and gate 28. Thereafter, the film projector drive system is activated and the film is advanced.

Those skilled in the art will appreciate the present invention incorporating a continuous trap rail assembly 64a and 64b, and continuous gate rail assembly 104a and 104b has eliminated the need for spring-loaded runners, pressure bands, and steel tensioning shoes which contact the film 14 disposed thereon. As such, damage to the film 14 caused by repeated contact with the film trap and gate assembly 24 is reduced or eliminated resulting in a decrease in film damage.

In closing, it is noted that specific illustrative embodiments of the invention have been disclosed hereinabove. However, it is to be understood that the invention is not limited to these specific embodiments. Accordingly, the invention is not limited to the precise embodiments described in detail hereinabove. With respect to the claims, it is applicant's intention that the claims not be interpreted in accordance with the sixth paragraph of 35 U.S.C. §112 unless the term "means" is used followed by a functional statement. Further, with respect to the claims, it should be understood that any of the claims described below may be combined for the purposes of the invention.

What is claimed is:

1. A film trap and gate assembly for motion picture projectors, comprising:
    a film movement channel, said film movement channel formed from a first member and a second member, said first member comprising first and second film trap rails and said second member comprising first and second film gate rails, the first trap rail and the first gate rail being respectively oppositely directed and the second trap rail and the second gate rail being respectively oppositely directed;
    said film movement channel having a thickness oft and a width of w, wherein t is greater than the thickness of motion picture film and w is greater than the width of motion picture film;
    wherein w is greater than t; and
    wherein motion picture film is disposed within and freely traverses said film movement channel and the spacing between the first trap rail and first gate rail and the spacing between the second trap rail and the second gate rail is such that surfaces do not touch whereby the portion of the film passing between the oppositely opposed rails provides sufficient clearance for the film to traverse freely through the space.

2. The device of claim 1 wherein said first film trap rail assembly comprises a first trap rail in communication with a first trap guide, and said second film trap rail assembly comprises a second film trap rail in communication with a second trap guide.

3. The device of claim 2 wherein said first trap rail assembly comprises a separable first trap rail in communication with a separable first trap guide.

4. The device of claim 2 wherein said first trap rail assembly comprises a first trap rail integral to said first trap guide.

5. The device of claim 2 wherein said second trap rail assembly comprises a separable second trap rail in communication with a separable second trap guide.

6. The device of claim 1 wherein said first film gate rail assembly comprises a first gate rail in communication with a first gate guide, and said second film gate rail assembly comprises a second film gate rail in communication with a second gate guide.

7. The device of claim 6 wherein said first gate rail assembly comprises a separable first gate rail in communication with a separable first gate guide.

8. The device of claim 6 wherein said first gate rail assembly comprises a first gate rail integral to said first gate guide.

9. The device of claim 6 wherein said second gate rail assembly comprises a separable second gate rail in communication with a separable second gate guide.

10. A film trap assembly for motion picture projectors, comprising:
    a trap body having an image aperture formed therein and having a first and second rail assembly;
    said first rail assembly comprising a first trap rail in communication with a first trap guide;
    said second rail assembly comprising a second trap rail in communication with a second trap guide;
    a gate body having an image aperture formed therein and having a first and second rail assembly;
    said first rail assembly comprising a first gate rail in communication with a first gate guide;
    said second rail assembly comprising a second gate rail in communication with a second gate guide;
    the first and second film trap rail assemblies and the first and second film gate rail assemblies being arranged such that the first trap rail and the first gate rail are respectively oppositely directed and the second trap rail acid the second gate rail are respectively oppositely directed; and
    wherein there is a spacing between the first trap rail and a first gate rail and a spacing between the second trap rail and the second gate rail such that surfaces of the oppositely directed rails do not touch whereby the portion of the film passing between the oppositely opposed rails provides sufficient clearance for the film to traverse freely though the spacings.

11. The device of claim 10 wherein said first rail assembly comprises a separable first trap rail in communication with a separable first trap guide.

12. The device of claim 10 wherein said first rail assembly comprises a first trap rail integral to said first trap guide.

13. The device of claim 10 wherein said second rail assembly comprises a separable second trap rail in communication with a separable second trap guide.

14. The device of claim 10 wherein said second rail assembly comprises a second trap rail integral to said second trap guide.

15. The device of claim 10 further comprising a stripper plate attached to said trap body.

16. The device of claim 15 wherein said stopper plate comprises an angled stripper blade in communication with an attachment flange.

17. The device of claim 16 wherein said angled blade comprises an at least one degree angle.

18. The device of claim 10 wherein said first rail assembly comprises a separable first gate rail in communication with a separable first gate guide.

19. The device of claim 10 wherein said first rail assembly comprises a first gate rail integral to said first gate guide.

20. The device of claim 10 wherein said second rail assembly comprises a separable second gate rail in communication with a separable second gate guide.

21. The device of claim 10 wherein said second rail assembly comprises a second gate rail integral to said second gate guide.

22. The device of claim 10, further comprising a film tensioning device attached to said gate body.

23. A film gate assembly for motion picture projectors, comprising:
   a gate body having an image aperture formed therein and having a first and second rail assembly attached thereto;
   said first rail assembly comprising a first gate rail in communication with a first gate guide;
   said second rail assembly comprising a second gate rail in communication with a second gate guide; and
   a film tensioning device attached to said gate body; the film tensioning device including:
   a deformable body;
   at least two tensioning rollers in communication with said deformable body; and,
   a tensioning device in communication with the at least two tensioning rollers.

24. The device of claim 23 wherein said deformable body disposes a roller cradle, said roller cradle in communication with said tensioning device and said at least two tensioning rollers.

25. The device of claim 23 wherein said at least two tensioning rollers are comprised of a non-abrasive material.

26. The device of claim wherein said at least two tensioning rollers axe comprised of urethane.

27. A film gate assembly for motion picture projectors, comprising:
   a gate body having an image aperture formed therein and having a first and second rail assembly attached thereto;
   said first rail assembly comprising a first gate rail in communication with a first gate guide;
   said second rail assembly comprising a second gate rail in communication with a second gate guide; and
   a tensioning device in communication with at least two tensioning rollers and a deformable body, and said tensioning device being a spring attached to said deformable body with a tensioning screw.

28. The device of claim 27 including a depth set device, wherein said depth set device comprises a screw.

29. A film tensioning assembly for motion picture projectors, comprising:
   a deformable body;
   at least two tensioning rollers in communication with said deformable body;
   a tensioning device is communication with said at least two tensioning rollers and said deformable body; and
   said tensioning device being a spring attached to said deformable body with a tensioning screw.

30. The device of claim 29 wherein said deformable body is comprised of aluminum.

31. The device of claim wherein said deformable body is comprised of steel.

32. The device of claim 29 wherein said tensioning device is a spring attached to said deformable body with a tensioning screw.

33. The device of claim 29 wherein said spring is compressable by said tensioning screw.

34. The device of claim 29 wherein said film tensioning assembly further comprises a roller cradle, said roller cradle in communication with said at least two tensioning rollers and said tensioning device, said roller cradle positionable on said deformable body.

35. The device of claim 29 wherein said deformable body further comprises an attachment orifice wherein said attachment orifice is used to attach said film tensioning device to a film nip or film gate, or both.

36. The device of claim 35 wherein said attachment orifice is oval.

37. The device of claim 29 wherein said at least two tensioning rollers further comprise roller wheels.

38. The device of claim 37 wherein said roller wheels are comprised of non-abrasive, materials.

39. The device of claim 37 wherein said roller wheels are urethane.

40. The device of claim 37 wherein said roller wheels further comprise bearings.

41. The film trap and gate system motion picture projectors, comprising:
   a film trap comprising a trap body having an image aperture formed therein and having a first and second rail assembly disposed thereon;
   a stripper plate attachable to said trap body, said stripper plate comprising an angled stripper blade in communication with an attachment flange;
   a film gate comprising a gate body having a projection aperture formed therein and having a first and second rail assembly disposed thereon;
   a film tensioning device attachable to said gate body, said film tensioning device comprising a deformable body having an attachment orifice formed therein and in communication with a roller cradle;
   said roller cradle in communication with four tensioning rollers and a tensioning device, said tensioning device in communication with a tensioning screw, wherein the tension applied to the roller cradle by the tensioning device is adjustable by actuating said tensioning screw; and,
   a film movement channel disposed between said film trap and said film gate, wherein said film trap engages said film gate thereby forming said film movement channel.

42. The device of claim 41 wherein said first trap rail assembly comprises a separable first trap rail and a separable second trap guide, and said second trap rail assembly comprises a separable second trap rail and a separable second guide.

43. The device of claim 41 wherein said first trap rail assembly comprises a first trap rail integral to a first trap guide, and said second trap rail is integral to said second trap guide.

44. The device of claim 41 wherein said first gate rail assembly comprises a separable first gate rail and a separable second gate guide, and said second gate rail assembly comprises a separable second gate rail and a separable second guide.

45. The device of claim 41 wherein said second gate rail assembly comprises a first gate rail integral to a first gate guide, and a second gate rail integral to said second gate rail.

46. A film trap and gate assembly for motion picture projectors, comprising:

a film trap having a first and second trap rail assembly, said first trap rail assembly comprising a first trap rail coupled to a first trap guide, and said second trap rail assembly comprising a second trap rail coupled to a second trap guide;

a film gate having a first and second gate rail assembly, said first gate rail assembly comprising a first gate rail coupled to a first gate guide, and said second gate rail assembly comprising a second gate rail coupled to a second gate guide;

wherein motion picture film is positioned on said film trap rail and wherein said film trap rail assembly receives said gate rail assembly; and wherein there is a spacing between the first trap rail and a first gate rail and a spacing between the second trap rail and the second gate rail such that surfaces of the oppositely directed rails do not touch whereby the portion of the film passing between the oppositely opposed rails provides sufficient clearance for the film to traverse freely through the spacings.

47. A film trap and gate assembly as claimed in claim 46 including a stripper plate for motion picture projectors, comprising:

a stripper blade;

an attachment flange;

said stripper blade attached to said attachment flange at an angle; and wherein the attachment flange and stripper plate being affixed to the trap.

48. The device of claim 47 wherein said angle is at least one degree.

49. A motion picture projector, comprising:

a light source;

a film movement device capable of engaging a portion of motion picture film and moving said film past said light source;

a film trap and gate assembly capable of receiving said film portion, said film trap and gate assembly comprising a film movement channel, said film movement channel formed from a first member and a second member, wherein said film movement channel has a thickness oft and a width of w, and wherein t is greater than the thickness of motion picture film and w is greater than the width of motion picture;

the film trap having spaced apart first and second film trap rails and the film gate having spaced apart first and second film gate rails, the first trap rail and the first gate rail being respectively oppositely directed and the second trap rail and the second gate rail being respectively oppositely directed;

the spacing between the first imp rail and first gale rail and the spacing between the second trap rail and the second gate rail being such that surfaces do not touch; and a lens system capable of projecting and image onto a projection surface.

50. A method of advancing motion picture film through a motion picture projector, comprising:

providing a motion picture projector;

locating motion picture film within said motion picture projector; forming a film movement channel with a film trap and a film gate, positioning said film within said film movement channel;

setting the spacing between spaced rails of the trap and oppositely spaced rails of the gate such as not to touch each other along longitudinal directed oppositely opposed surfaces thereby to form a passage for receiving respectively opposite surface portions of the film passing between the oppositely opposed rails surfaces thereby to provide sufficient clearance for the film to traverse freely through the passages;

attaching said film to a film drive system; and moving said film freely through said film movement channel, wherein said film intermittently contacts said film trap, or said film gate, or both.

51. The method of claim 50 wherein said film movement channel is formed by a trap rail assembly located on the film trap engaging a gate rail assembly located on said film gate.

52. The method of claim 50 further comprising engaging said film with a film tensioning device.

53. The method of claim 52 further comprising adjusting said film tensioning device to increase the tension applied to the film.

54. The method of claim 53 further comprising adjusting the film tensioning device to decrease the tension applied to the film.

55. The method of claim 50 wherein the film movement through the channel can be effected in both the forward downwards direction of fun movement and the reverse upwards direction of film movement according to a selected direction.

56. A film trap assembly for motion picture projectors, comprising:

a trap body having a flat surface, an image aperture formed in the flat surface, and having a first and second rail assembly disposed thereon to either side of the image aperture;

a stripper plate attachable to said trap body;

the stripper plate having a contiguous interface between the end of the surface of the trap body and the stripper plate; and the trap body and stripper plate being aligned in a generally vertical direction.

57. The trap assembly of claim 56 wherein said stripper plate is attached to an attachment flange so that the surface of the stripper plate is at an angle relative to the trap surface; said angle being at least one degree.

58. A method of advancing motion picture film through a motion picture projector, comprising:

providing a motion picture projector;

locating a motion picture film with said motion picture projector;

forming a film movement channel with a film trap and a film gate;

positioning said film within said film movement channel; the trap having a body with a fiat surface, an image aperture formed in the flat surface, a stripper plate attached to said trap body, said stripper plate baying a contiguous interface between the end of the surface of the trap body and the stripper plate;

attaching said film to a film drive system; and moving said film through said film movement channel, wherein said film intermittently contacts said film trap, or said film gate, or both.

59. The method of claim 58 wherein the film advance through the channel is both in the forward downwards direction of film movement and the reverse upwards direction of film movement according to a selected direction.

60. The method of claim 58 wherein said stripper plate is attached to an attachment flange so that the surface of the stripper plate is at an angle relative to the trap surface, said angle being at least one degree.

61. A film gate assembly for motion picture projectors, comprising:

a gate body having an image aperture formed therein and having a first and second rail assembly attached thereto;

said first rail assembly comprising a first gate rail in communication with a first gate guide;

said second rail assembly comprising a second gate rail in communication with a second gate guide; and a deformable body comprising an attachment orifice wherein said attachment orifice is used to attach a film tensioning device to a film trap or film gate, or both.

62. A film gate assembly for motion picture projectors, comprising:

a gate body having an image aperture formed therein and having a first and second rail assembly attached thereto;

said first rail assembly comprising a first gate rail in communication with a first gate guide;

said second rail assembly comprising a second gate rail in communication with a second gate guide; and a film tensioning assembly comprising a roller cradle said roller cradle being in communication with said at least two tensioning rollers and said tensioning device, said roller cradle being positionable on a deformable body.

63. The film tensioning assembly for motion picture projectors, comprising:

a deformable body;

at least two tensioning rollers in communication with said deformable body;

a tensioning device is communication with said at least two tensioning rollers and said deformable body; and said film tensioning assembly further comprising a roller cradle, said roller cradle being in communication with said at least two tensioning rollers and said tensioning device, said roller cradle being positionable on said deformable body.

64. A film tensioning assembly for motion picture projectors, comprising:

a deformable body;

at least two tensioning rollers in communication with said deformable body;

a tensioning device is communication with said at least two tensioning rollers and said deformable body; and a deformable body further comprising an attachment orifice wherein said attachment orifice is used to attach said film tensioning device to a film trap or film gate, or both.

* * * * *

UNITED STATES PATENT AND TRADEMARK OFFICE
CERTIFICATE OF CORRECTION

PATENT NO. : 6,742,896 B2
DATED : June 1, 2004
INVENTOR(S) : Donald Quiroz et al.

It is certified that error appears in the above-identified patent and that said Letters Patent is hereby corrected as shown below:

<u>Title page,</u>
Item [57], ABSTRACT,
Line 16, please delete the word "showing" and replace with the word -- showings --, to read -- the number of showings of a motion picture film --;

<u>Column 1,</u>
Line 55, please delete the word "sharpen" and replace with the word -- sharpened --, to read -- a film trap will include a sharpened device --;

<u>Column 2,</u>
Line 18, please delete the word "en", to read "utilized on a number of film projector";
Line 43, please insert the word -- of -- between the words "displacement" and "the", to read "lateral displacement of the film";
Line 47, please insert the word -- on -- between the words "bands" and "the", to read -- bands on the film, thereby decreasing or eliminating --;
Line 52, please insert the word -- one -- between the words "least" and "tensioning", to read -- least one tensioning roller attached thereto --;

<u>Column 3,</u>
Line 15, please insert the words, -- one of the -- after the word "least", to read -- At least one of the tensioning rollers are in communication --;
Lines 30-32, please replace the entire sentence beginning with the words "The first member has a", and replace with the sentence, -- The first member has a thickness and width greater than the thickness and width of the motion picture film --;
Line 40, please delete the word "the", to read -- using a film trap and gate assembly to form --;

<u>Column 4,</u>
Line 31, please delete the word "engaging" and replace with the word -- engage --, to read -- preparing to engage film--;

<u>Column 5,</u>
Line 9, please delete the word "is", to read -- and positions the film for entering --;
Line 34, please delete the words "and" and "the", to read -- The film 14 exits through the second end --;
Line 42, please delete the word "a" and replace with the word -- as --, to read -- such as urethane in another aspect --;

UNITED STATES PATENT AND TRADEMARK OFFICE
CERTIFICATE OF CORRECTION

PATENT NO. : 6,742,896 B2
DATED : June 1, 2004
INVENTOR(S) : Donald Quiroz et al.

It is certified that error appears in the above-identified patent and that said Letters Patent is hereby corrected as shown below:

Column 6,
Line 68, please insert the word -- is -- between the words "invention" and "shown', to read -- of the present invention is shown --;

Column 7,
Line 28, please insert the word -- a -- between the words "with" and "screw", to read -- gate body with a screw 116 which is positioned --;
Line 66, please delete the word "a", to read -- which utilize steel tensioning shoes which contact --;

Column 8,
Line 44, please delete the word "to" and replace with the word -- than --, to read -- larger than the width of the film --;

Column 9,
Line 4, please delete the word "are", to read -- and gate 28 positioned within the film projector 10 --;
Line 50, please delete the word "oft" and replace with the words -- of --, and -- t --, to read -- said film movement channel having a thickness thickness of t and a width of w --;

Column 10,
Line 42, please delete the word "acid" and replace with the word -- and --, to read -- and the second gate rail are respectively oppositely --;
Line 64, please delete the word "stopper" and replace with the word -- stripper --, to read -- stripper plate comprises an angled stripper blade --;

Column 11,
Line 24, please delete the semicolon and replace with a comma, to read -- a film tensioning device attached to said gate body, the --;
Line 28, please delete the comma after the word "and", to read -- communication with said deformable body; and --;
Line 37, please insert the number -- 23 -- between the words "claim" and "wherein", to read -- claim 23 wherein said at least two tensioning rollers --;
Line 38, please delete the word "axe" and replace with the word -- are --, to read -- tensioning rollers are comprised of urethane --;
Line 58, please delete the word "is" and replace with the word -- in --, to read -- a tensioning device in communication with said at least --;

UNITED STATES PATENT AND TRADEMARK OFFICE
CERTIFICATE OF CORRECTION

PATENT NO. : 6,742,896 B2
DATED : June 1, 2004
INVENTOR(S) : Donald Quiroz et al.

It is certified that error appears in the above-identified patent and that said Letters Patent is hereby corrected as shown below:

Column 12,
Line 14, please delete the word "nip" and replace with the word -- trap --, to read -- a film trap or film gate, or both. --;
Line 45, please delete the comma after the word "and", to read -- tensioning screw, and --;
Line 51, please delete the word "second" and replace with the word -- first --, to read -- first trap guide, and said second trap rail assembly --;

Column 13,
Line 42, please delete the word "oft", and replace with the words -- of -- and -- t --, to read -- thickness of t and a width of w --;
Line 51, please delete the word "imp" and replace with the word -- trap --, to read "the spacing between the first trap rail";
Line 51, please delete the word "gale" and replace with the word -- gate --, to read "first gate rail";
Line 54, please delete the word "and" and replace with the word -- an --, to read -- a lens system capable of projecting an image --;
Line 60, please delete the semicolon and replace with a comma, to read -- projector, forming a film movement channel with a film --;

Column 14,
Line 24, please delete the word "fun" and replace with the word -- film -- to read -- downwards direction of film movement and the reverse --;
Line 53, please delete the word "baying" and replace with the word -- having --, to read -- attached to said trap body, said stripper plate having --;

Column 15,
Line 16, please delete the word "haying", and replace with the word -- having --, to read -- a gate body having an image aperture formed therein --;

UNITED STATES PATENT AND TRADEMARK OFFICE
CERTIFICATE OF CORRECTION

PATENT NO. : 6,742,896 B2
DATED : June 1, 2004
INVENTOR(S) : Donald Quiroz et al.

It is certified that error appears in the above-identified patent and that said Letters Patent is hereby corrected as shown below:

Column 16,
Line 6, please delete the word "is" and replace with the word -- in --, to read --a tensioning device in communication with said at least --; and
Line 18, please delete the word "is" and replace with the word -- in --, to read -- a tensioning device in communication with said at least --.

Signed and Sealed this

Twelfth Day of April, 2005

JON W. DUDAS
*Director of the United States Patent and Trademark Office*